United States Patent
Morii

(10) Patent No.: US 10,724,841 B2
(45) Date of Patent: Jul. 28, 2020

(54) DETECTOR, SURFACE PROPERTY MEASURING MACHINE, AND ROUNDNESS MEASURING MACHINE

(71) Applicant: Tokyo Seimitsu Co., Ltd., Tokyo (JP)

(72) Inventor: Hideki Morii, Tsuchiura (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 16/544,609

(22) Filed: Aug. 19, 2019

(65) Prior Publication Data

US 2019/0368855 A1 Dec. 5, 2019

Related U.S. Application Data

(63) Continuation of application No. PCT/JP2018/011450, filed on Mar. 22, 2018.

(30) Foreign Application Priority Data

Mar. 27, 2017 (JP) .................................. 2017-061387

(51) Int. Cl.
*G01B 5/20* (2006.01)
*G01B 5/016* (2006.01)
*G01B 7/28* (2006.01)

(52) U.S. Cl.
CPC .............. *G01B 5/201* (2013.01); *G01B 5/016* (2013.01); *G01B 7/282* (2013.01)

(58) Field of Classification Search
CPC ........ G01B 5/201; G01B 5/016; G01B 7/282; G01B 5/20; G01B 5/012
See application file for complete search history.

(56) References Cited

U.S. PATENT DOCUMENTS

| | | | |
|---|---|---|---|
| 6,209,217 B1 | 4/2001 | Tsuruta et al. | |
| 2001/0025427 A1* | 10/2001 | Lotze | G01B 21/045 33/559 |

(Continued)

FOREIGN PATENT DOCUMENTS

| | | |
|---|---|---|
| JP | 06273104 A | 9/1994 |
| JP | 2000-111334 A | 4/2000 |

(Continued)

OTHER PUBLICATIONS

Tokyo Seimitsu Co., Ltd., International Preliminary Report on Patentability, PCT/JP2018/011450, Oct. 9, 2018, 14 pgs.

*Primary Examiner* — Herbert K Roberts
*Assistant Examiner* — John M Royston
(74) *Attorney, Agent, or Firm* — Morgan, Lewis & Bockius LLP

(57) ABSTRACT

There are provided a detector, a surface property measuring machine and a roundness measuring machine for automatically measuring a plurality of surfaces to shorten the time necessary for measurement. This problem is solved by a detector provided with a stylus for supporting a contact coming in contact with a surface of an object to be measured, a holder configured to hold the stylus, a measuring part configured to hold the holder to be capable of swinging by a rotating shaft and detect a displacement of the holder, and a body configured to accommodate the measuring part, wherein the holder holds the stylus such that a stylus axis as an axis of the stylus and a body axis as an axis of the body are in parallel, and the stylus axis and the body axis are offset in a first direction perpendicular to the body axis and the rotating shaft.

10 Claims, 38 Drawing Sheets

(56) References Cited

U.S. PATENT DOCUMENTS

| | | | |
|---|---|---|---|
| 2001/0034948 A1 | 11/2001 | Matsumiya et al. | |
| 2004/0168332 A1 | 9/2004 | Hama et al. | |
| 2009/0255139 A1 | 10/2009 | Wallace et al. | |
| 2011/0088273 A1* | 4/2011 | Yamamoto | G01B 3/008 33/561 |
| 2014/0331511 A1* | 11/2014 | Yamauchi | G01B 5/20 33/558 |
| 2016/0084631 A1 | 3/2016 | Nakayama | |

FOREIGN PATENT DOCUMENTS

| | | |
|---|---|---|
| JP | 2002-022433 A | 1/2002 |
| JP | 2004-257958 A | 9/2004 |
| JP | 2013-542417 A | 11/2013 |
| JP | 2016-065751 A | 4/2016 |
| WO | WO 2012/037059 A1 | 3/2012 |

* cited by examiner

DETECTOR, SURFACE PROPERTY MEASURING MACHINE, AND ROUNDNESS MEASURING MACHINE

CROSS-REFERENCE TO RELATED APPLICATIONS

The present application is a Continuation of PCT International Application No. PCT/JP2018/011450 filed on Mar. 22, 2018 claiming priority under 35 U.S.C § 119(a) to Japanese Patent Application No. 2017-061387 filed on Mar. 27, 2017. Each of the above applications are hereby expressly incorporated by reference, in its entirety, into the present application.

BACKGROUND OF THE INVENTION

1. Field of the Invention

The present disclosure relates to a detector, a surface property measuring machine, and a roundness measuring machine, and particularly, to technologies for speeding up and automatizing measurement.

2. Description of the Related Art

In a case of measuring an outer peripheral surface of an object to be measured by a roundness measuring machine, a stylus whose attitude has an angle with respect to a detector body is used in order to prevent collision between the detector body and the object to be measured. In a case of continuously measuring an inner surface of a narrow hole of the object to be measured by such a detector, it is necessary to change the attitude of the stylus so that the stylus is disposed along an axis direction of the detector in order to prevent the collision between the stylus and the object to be measured.

Further, a similar attitude change is necessary in a case of measuring an upper surface of the object to be measured and upper and lower surfaces of a thin groove formed on the outer peripheral surface of the object to be measured.

Conventionally, there are problems that it takes time to perform such an attitude change because it is manually performed by an operator, and that it is difficult to automatically perform the measurement.

Considering the problems, in order to automatically perform the attitude change, Patent Literature 1 proposes a roundness measuring machine which includes a protrusion fixed on a roundness measuring machine body so that the attitude can be changed by causing the stylus to abut on the protrusion.

CITATION LIST

Patent Literature 1: Japanese Patent Application Laid-Open No. 2016-065751

SUMMARY OF THE INVENTION

The apparatus described in Patent Literature 1, however, has a problem that it is necessary to add the protrusion for performing the attitude change. In addition, there is a problem that the system becomes more complex due to control and so on for causing the stylus to abut on the protrusion and shifting the stylus so as to have an intended attitude, which leads to a cost increase. Further, the time for performing the attitude change is necessary.

The present invention is made in view of the foregoing problems, and an object of the present invention is to provide a detector, a surface property measuring machine, and a roundness measuring machine, which automatically measure a plurality of surfaces of an object to be measured and shorten the time necessary for the measurement.

In order to achieve the object, a detector according to an aspect includes: a stylus configured to support a contact which is brought into contact with a surface of an object to be measured; a holder (holding part) configured to hold the stylus; a measuring part configured to swingably hold the holder with a rotating shaft and detect a displacement of the holder; and a body (body part) configured to accommodate the measuring part, wherein the holder holds the stylus such that a stylus axis being an axis of the stylus and a body axis being an axis of the body are in parallel with each other, and the stylus axis and the body axis are offset in a first direction orthogonal to the body axis and the rotating shaft.

According to the present aspect, the stylus is held such that the stylus axis being the axis of the stylus and the body axis being the axis of the body part are in parallel with each other, and the stylus axis and the body axis are offset in the first direction orthogonal to the body axis and the rotating shaft. Therefore, it is possible to automatically measure a plurality of surfaces of the object to be measured without interference between the body and the object to be measured, thereby shortening the time necessary for the measurement.

It is preferable that a distance in the first direction between the body axis and a position where the contact is brought into contact with the object to be measured is larger than a distance in the first direction between the body axis and an outer peripheral surface of the body. As a result, the body does not come into contact with the object to be measured.

It is preferable that the body part is formed into a cylindrical shape. As a result, a displacement of an inner surface of the object to be measured can be appropriately detected.

It is preferable that a shape of the contact is any one of a spherical shape, a conical shape, a polygon pyramid shape, a disc shape and an ax blade shape. As a result, a displacement of the holder can be appropriately detected.

It is preferable that the measuring part supports the holder rotatably around the rotating shaft. As a result, the stylus can be appropriately held.

The measuring part may have a parallel link mechanism including: a fixed link having a pair of rotating shafts; a pair of movable links one ends of which are respectively supported to be rotatable by the pair of the rotating shafts; and a swinging link configured to hold the stylus, the swinging link being swingably supported by rotating shafts which are respectively provided in another ends of the pair of the movable links. Thereby, the stylus can be appropriately held.

In order to achieve the object, a surface property measuring machine according to an aspect includes: a detector having a stylus configured to support a contact which is brought into contact with a surface of an object to be measured, a holder configured to hold the stylus, a measuring part configured to swingably hold the holder with a rotating shaft and detect a displacement of the holder, and a body configured to accommodate the measuring part, wherein the holder holds the stylus such that a stylus axis being an axis of the stylus and a body axis being an axis of the body are in parallel with each other, and the stylus axis and the body axis are offset in a first direction orthogonal to the body axis and the rotating shaft; a relative moving part configured to cause the contact to come into contact with a measurement surface of the object to be measured and relatively move the object to be measured and the contact; and a surface property measuring part configured to measure a surface property of the object to be measured based on a detection result of the detector.

According to the present aspect, it is possible to automatically measure a plurality of surfaces of the object to be measured, without interference between the body and the object to be measured, thereby shortening the time necessary for the measurement.

In order to achieve the object, a roundness measuring machine is configured to include a surface property measuring machine including: a detector having a stylus configured to support a contact which is brought into contact with a surface of an object to be measured, a holder configured to hold the stylus, a measuring part configured to swingably hold the holder with a rotating shaft and detect a displacement of the holder, and a body configured to accommodate the measuring part, wherein the holder holds the stylus such that a stylus axis being an axis of the stylus and a body axis being an axis of the body are in parallel with each other, and the stylus axis and the body axis are offset in a first direction orthogonal to the body axis and the rotating shaft; a relative moving part configured to cause the contact to come into contact with a measurement surface of the object to be measured and relatively move the object to be measured and the contact; and a surface property measuring part configured to measure a surface property of the object to be measured based on a detection result of the detector, wherein the relative moving part includes a rotating stage configured to rotate an object to be measured, and the surface property measuring part measures roundness of the object to be measured.

According to the present aspect, it is possible to automatically measure a plurality of surfaces of the object to be measured without interference between the body and the object to be measured, thereby shortening the time necessary for the measurement.

According to the present invention, it is possible to automatically measure a plurality of surfaces and shorten the time necessary for the measurement.

DESCRIPTION OF EMBODIMENTS

Hereinafter, an explanation will be in detail made of preferred embodiments in the present invention with reference to the accompanying drawings.

<Configuration of Roundness Measuring Machine>

Figure 1A:
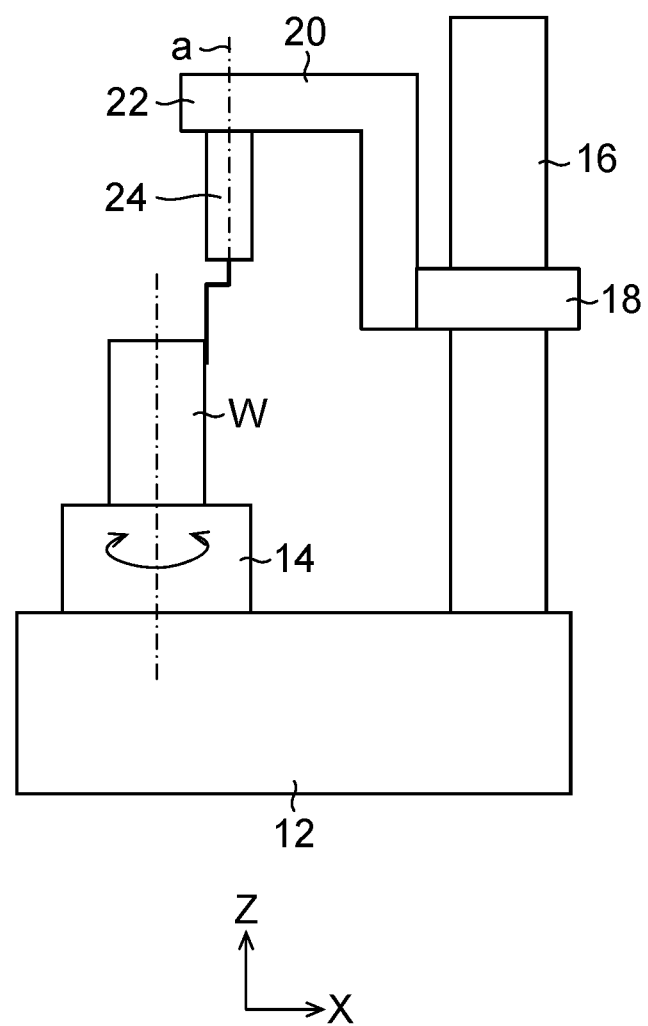
FIG. 1A is a diagram illustrating an entire configuration of a surface property measuring machine (a roundness measuring machine).
Figure 1B:
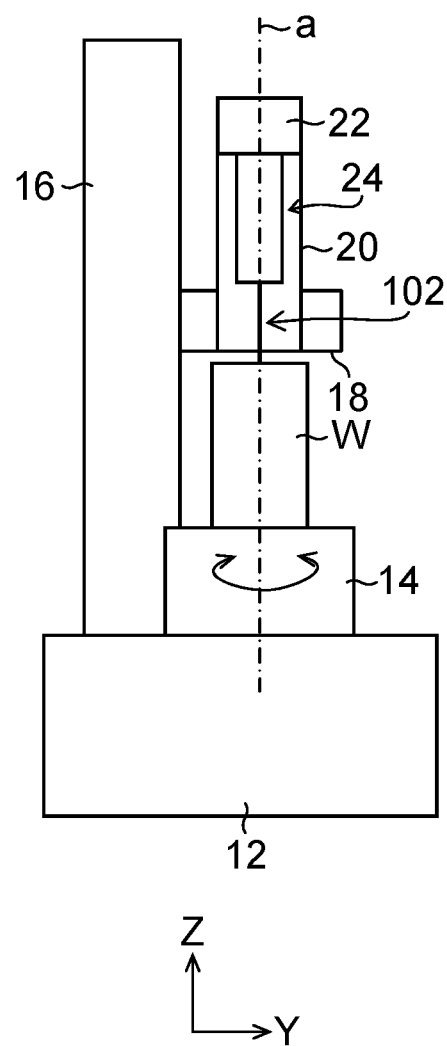
FIG. 1B is a diagram illustrating an entire configuration of the surface property measuring machine (the roundness measuring machine).
Figure 1C:
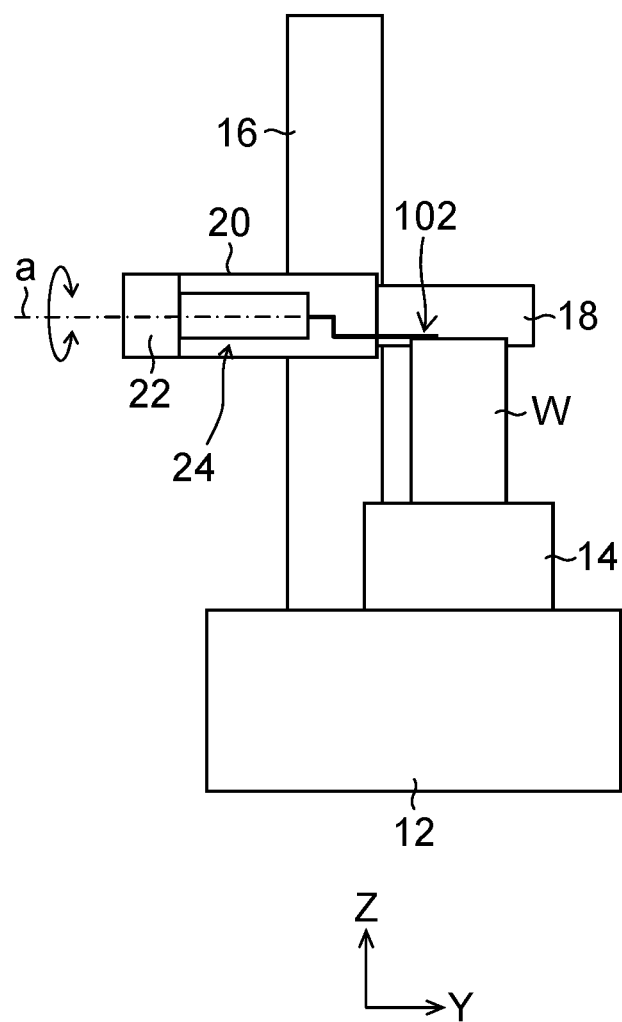
FIG. 1C is a diagram illustrating an entire configuration of the surface property measuring machine (the roundness measuring machine).

FIG. 1A to FIG. 1C are drawings illustrating an entire configuration of a surface property measuring machine according to the present embodiment. FIG. 1A is a front view and FIG. 1B is a side view. FIG. 1C is a side view illustrating the surface property measuring machine in a state where an attitude of a stylus is changed from a state illustrated in FIG. 1B. As illustrated in FIG. 1A to FIG. 1C, a roundness measuring machine 10 is provided with a rotating stage (a rotating platform) 14 on a body base (a base platform) 12. The rotating stage is configured to place thereon, a work W as an object to be measured. The rotating stage 14 is finely fed in an X direction and in a Y direction by an X-direction fine-adjustment knob (unillustrated) and a Y-direction fine-adjustment knob (unillustrated). Inclination of the rotating stage 14 is adjusted in the X direction and in the Y direction by an X-direction inclination knob (unillustrated) and a Y-direction inclination knob (unillustrated).

The X direction, the Y direction and a Z direction are directions perpendicular to each other, the X direction is a horizontal direction (a moving direction of an arm 20 to be described later), the Y direction is a horizontal direction perpendicular to the X direction, and the Z direction is a vertical direction (a moving direction of a carriage 18 to be described later).

A motor (unillustrated) connected to the rotating stage 14 is equipped inside of the body base 12. The rotating stage 14 rotates around a rotating axis which is parallel to the Z direction.

The work W is placed on an upper surface of the rotating stage 14. The work W illustrated in FIG. 1A and FIG. 1B is formed into a cylindrical shape having a specific outer diameter and a specific inner diameter. The work W is placed such that the center axis is coaxial with the rotating axis of the rotating stage 14. The work W placed on the rotating stage 14 rotates around the rotating axis together with the rotating stage 14.

A column (a support column) 16 is vertically erected on the body base 12 to extend in the vertical direction (the Z direction), and the carriage 18 is supported by the column 16 to be movable in the vertical direction (the Z direction). The carriage 18 moves in the Z direction by a drive of a motor (unillustrated).

The arm 20 (the radial moving shaft) is supported by the carriage 18 to be movable in the horizontal direction (the X direction). The arm 20 moves in the X direction by a drive of a motor (unillustrated).

The arm 20 is supported to be capable of revolving around a revolving axis in parallel with the X direction.

A detector holder 22 is disposed at a tip end of the arm 20, and a detector 24 is removably attached to the detector holder 22. For example, an electrical micrometer using a differential transformer is used as the detector 24. The details of the detector 24 will be described later.

Positions of the detector 24 in the Z direction and the X direction can be changed with the movement of the carriage 18 in the Z direction and with the movement of the arm 20 in the X direction. A direction of the detector 24 can be changed by revolution of the arm 20.

A detector axis a of the detector 24 is in parallel with the Z direction in a state illustrated in FIG. 1B. The attitude of the detector 24 illustrated in FIG. 1B is referred to as a first attitude. FIG. 1C illustrates a state where the arm 20 is revolved in a counterclockwise direction in the FIG. 1C by 90 degrees from the state illustrated in FIG. 1B. In this state, the detector axis a of the detector 24 is in parallel with the Y direction, and the attitude of the detector 24 is referred to as a second attitude.

In the roundness measuring machine 10 with this configuration, the work W and the detector 24 are moved relative to each other by rotating the rotating stage 14 (an example of the relative moving part). It is possible to measure a surface property of the work W based on a detection result of the detector 24 (an example of a surface property measuring part). Particularly, in the first attitude of the detector 24, it is possible to measure the roundness of an outer surface, an inner surface and a narrow-hole inner surface of the cylindrical work W. In the second attitude, it is possible to measure the surface property of an upper surface and an upper-and-lower surfaces of a narrow-groove of the work W.

<Problem of Conventional Detector>

Figure 2:
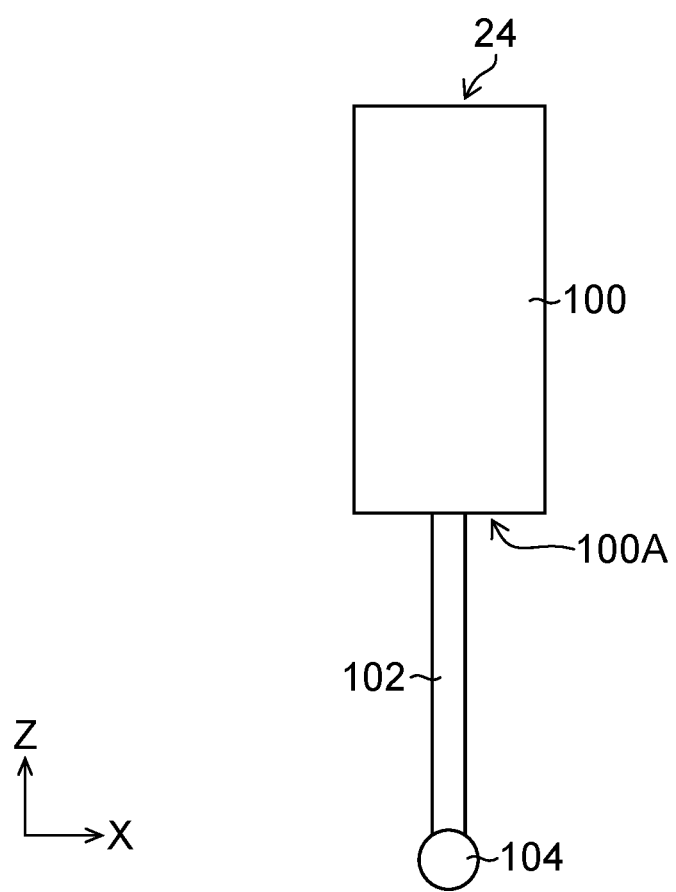
FIG. 2 is a diagram illustrating an example of a configuration of a conventional detector.

FIG. 2 is a diagram illustrating an example of the configuration of a conventional detector.

A detector 24 includes: a stylus 102 which has a bar shape and extends from a lower end 100A of a cylindrical detector body 100; and a displacement detecting part (not-illustrated) configured to detect a displacement amount of the stylus 102 with a differential transformer or the like, and output the detected displacement amount as an electrical signal. The displacement detecting part is disposed inside of the detector body 100.

The stylus 102 has a contact (contactor) 104 at a tip end, and the contact 104 is configured to brought into contact with a surface of a work W. The stylus 102 is supported by the detector body 100 to be displaceable in both directions along an X direction, and is urged in both the directions along the X direction with an urging member such as a spring.

In addition, the stylus 102 is configured to be capable of changing the attitude by changing an angle of the stylus 102 with respect to the rotating axis of a rotating stage 14. FIG. 2 illustrates the detector 24 when the stylus 102 is set to a vertical attitude where the stylus 102 is in parallel with a Z direction.

Figure 3A:
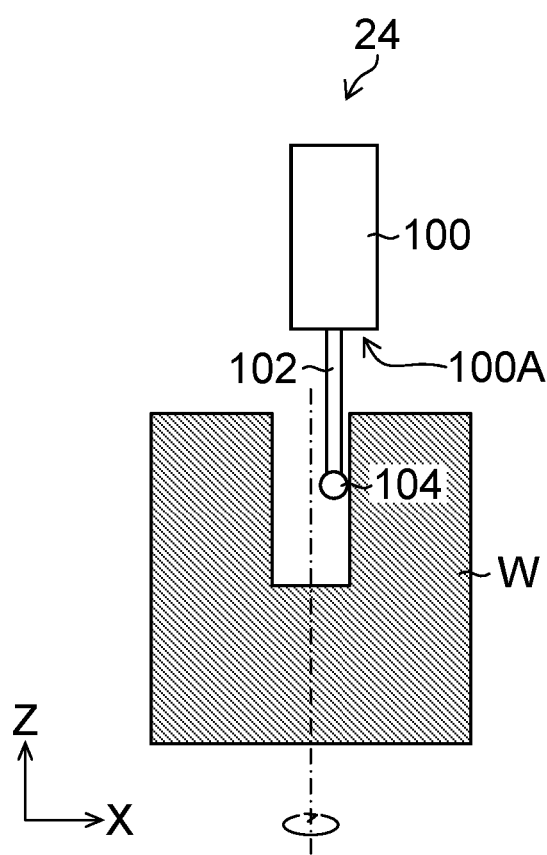
FIG. 3A is a schematic diagram illustrating a roundness measurement of a work at a vertical attitude.
Figure 3B:
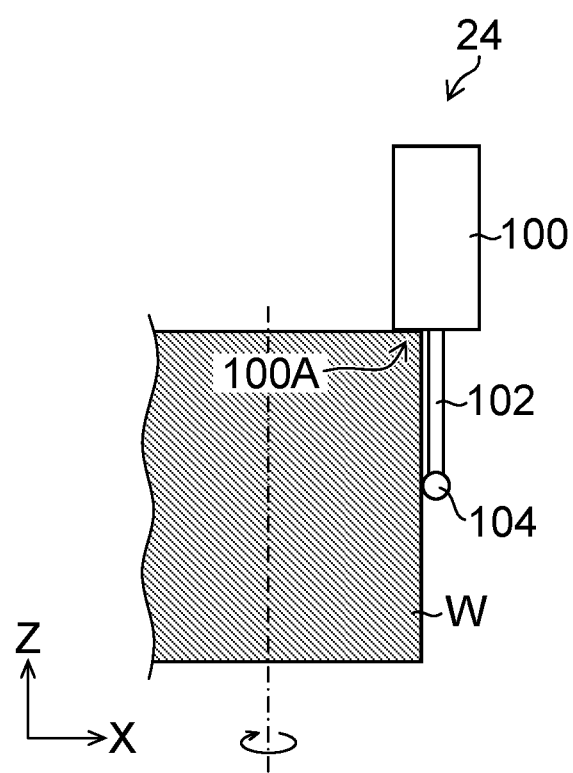
FIG. 3B is a schematic diagram illustrating a roundness measurement of a work at the vertical attitude.
Figure 3C:
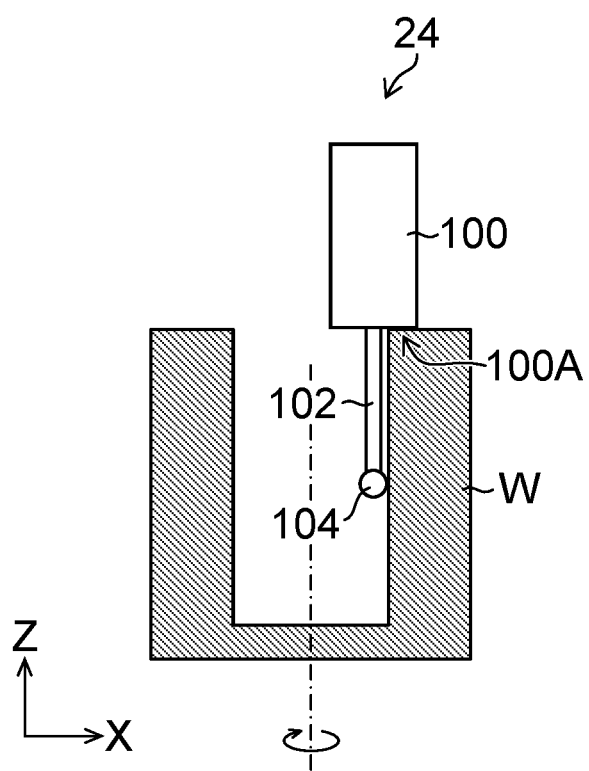
FIG. 3C is a schematic diagram illustrating a roundness measurement of a work at the vertical attitude.

FIG. 3A to FIG. 3C are schematic diagrams illustrating the roundness measurement of the work W at the vertical attitude. The vertical attitude is, as illustrated in FIG. 3A, suitable for the roundness measurement of an inner surface of a narrow hole of the work W. The vertical attitude, however, has a possibility that the lower end 100A of the detector body 100 collides with the work W when measuring an outer surface of the cylindrical work W illustrated in FIG. 3B and measuring an inner surface of the cylindrical work W illustrated in FIG. 3C.

Figure 4:
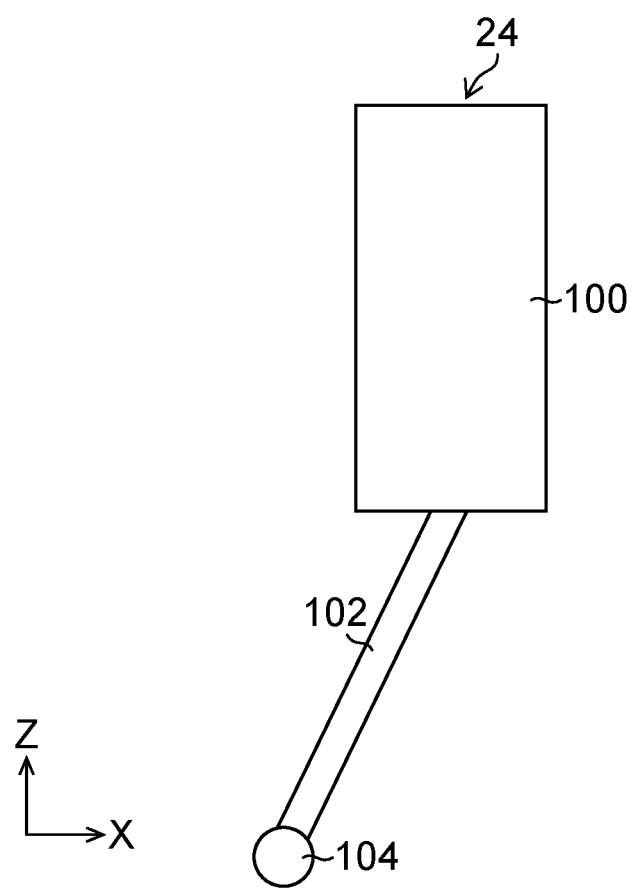
FIG. 4 is a diagram illustrating an example of a configuration of a detector set at an inclined attitude.

On the other hand, FIG. 4 is a diagram illustrating the detector 24 in which the stylus 102 is set to an inclined attitude where the stylus 102 has a specific inclined angle with respect to the Z direction.

Figure 5A:
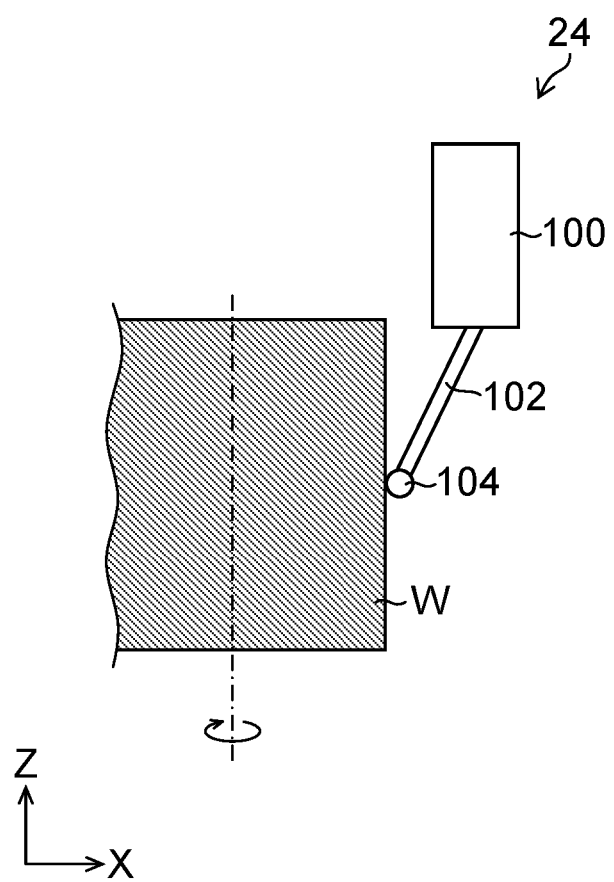
FIG. 5A is a schematic diagram illustrating a roundness measurement of a work at the inclined attitude.
Figure 5B:
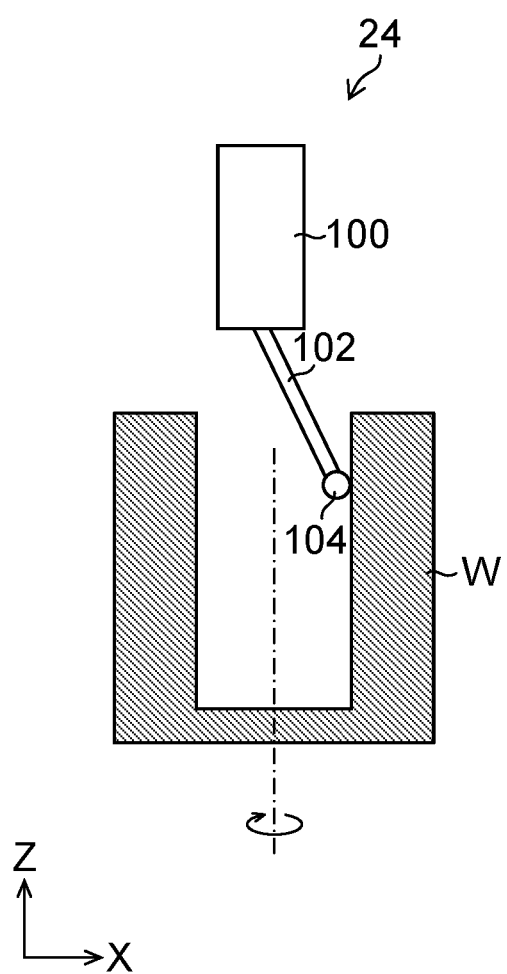
FIG. 5B is a schematic diagram illustrating a roundness measurement of a work at the inclined attitude.
Figure 5C:
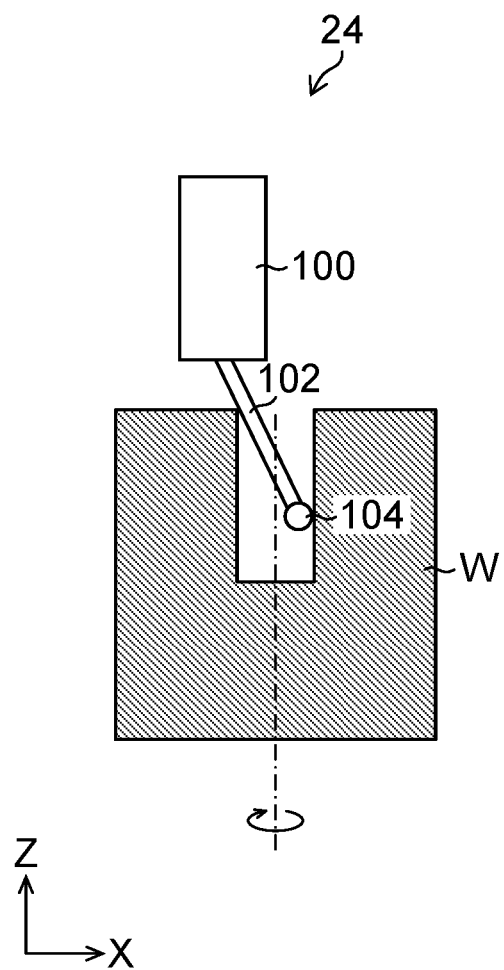
FIG. 5C is a schematic diagram illustrating a roundness measurement of a work at the inclined attitude.

FIG. 5A to FIG. 5C are schematic diagrams illustrating the roundness measurement of the work W at the inclined attitude. The inclined attitude is suitable for the measurement of an outer surface of the columnar work W illustrated in FIG. 5A and the measurement of an inner surface of the cylindrical work W illustrated in FIG. 5B. The inclined attitude, however, has a possibility that the stylus 102 collides with the work W when measuring an inner surface of a narrow-hole of the work W illustrated in FIG. 5C.

Thus, it is necessary for the conventional detector 24 to change the attitude of the stylus 102 depending on the measurement surface of the work W.

Figure 6A:
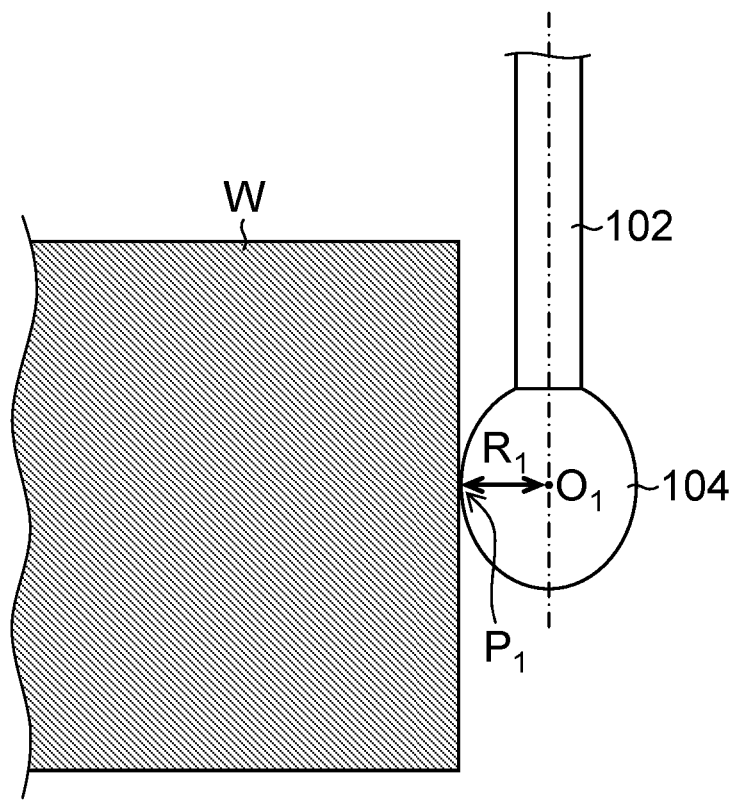
FIG. 6A is a diagram illustrating a position of a contact point of a contact with respect to a work.
Figure 6B:
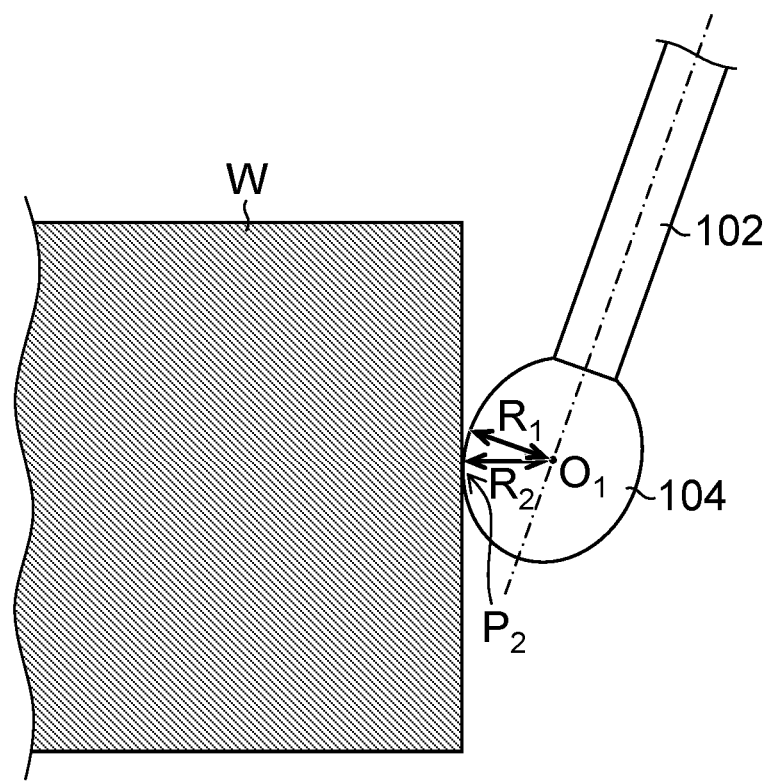
FIG. 6B is a diagram illustrating a position of a contact point of the contact with respect to the work.

Further, there will be considered a case where a substantially spherical contact 104 is unevenly worn. FIG. 6A and FIG. 6B are schematic diagrams illustrating a position of a contact point between the contact 104 and the work 104. FIG. 6A illustrates a case where the stylus 102 is in the vertical attitude and FIG. 6B illustrates a case where the stylus 102 is in the inclined attitude.

As illustrated in FIG. 6A, in the vertical attitude, a distance from a contact point $P_1$ between the contact 104 and the work W, to a center $O_1$ of the contact 104 is $R_1$. On the other hand, as illustrated in FIG. 6B, in the inclined attitude a distance from a contact point $P_2$ to the center $O_1$ of the contact 104 is $R_2$.

Herein, in a case where the contact 104 is unevenly worn, $R_1 \neq R_2$. Accordingly, in a case where the contact 104 is unevenly worn, when the attitude of the stylus 102 is changed, the measurement result changes depending upon the attitude of the stylus 102. In this way, there is a problem that it is difficult to obtain high measurement reproducibility.

<Configuration of Detector>

Figure 7:
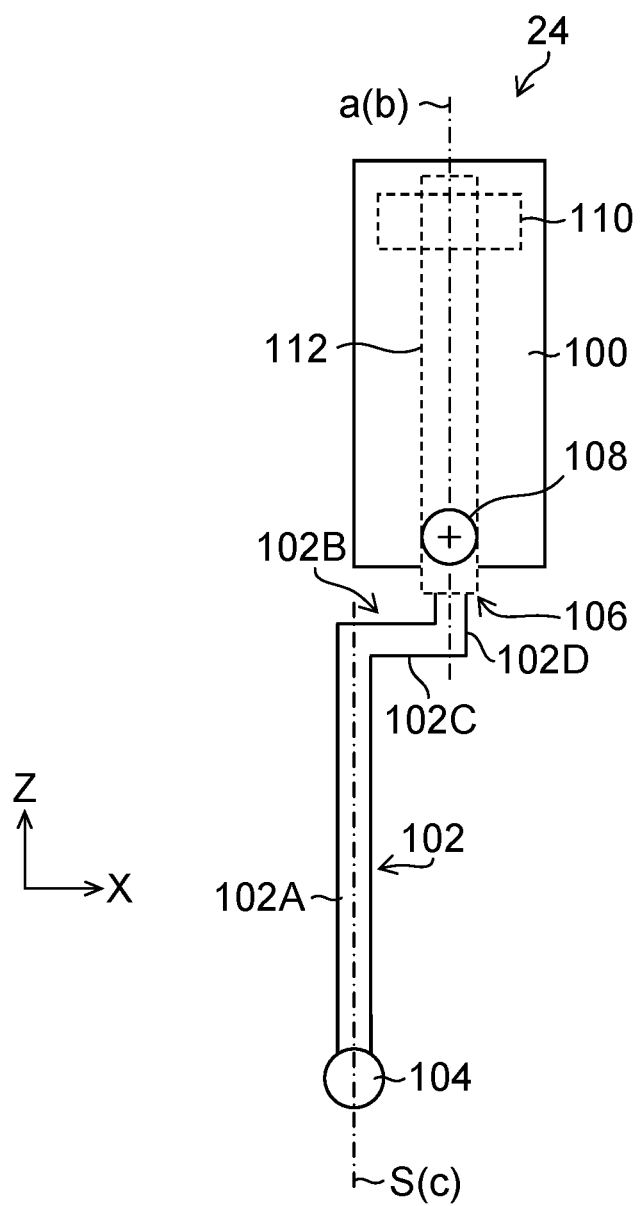
FIG. 7 is a diagram illustrating an example of a configuration of a detector according to the present embodiment.

FIG. 7 is a diagram illustrating an example of configuration of a detector 24 according to the present embodiment. The detector 24 includes a cylindrical detector body 100, a stylus 102, a contact 104, a holding part (holder) 106, a rotating shaft 108, a measuring part 110 and an arm part (arm) 112.

The detector 24 has a detector axis a which is an axis perpendicular to a main displacement direction (an X direction) of the contact 104 at the time the stylus 102 rotates/displaces, and the rotating shaft 108.

The detector body 100 (an example of a body part) is formed into a cylindrical shape, and has a body axis b as a center axis. The detector body 100 accommodates the holding part 106 and the measuring part 110. In the present embodiment, the detector axis a is coaxial with (conforms to) the body axis b.

The holding part 106 holds the stylus 102 and is swingably held by the rotating shaft 108. Here, the holding part 106 is supported by the detector body 100 so as to be rotatable (swingable) around the rotating shaft 108 which is perpendicular to (in parallel with the Y direction) a sheet surface in FIG. 7. The stylus 102 is urged in the left-rightward direction in the figure (the X direction perpendicular to the detector axis a) by an unillustrated spring.

The stylus 102 which is held by the holding part 106 extends from the detector body 100. The stylus 102 supports at a tip end thereof, the contact 104 which is brought into contact with a surface of the work W. An interposing member may be placed between the stylus 102 and the contact 104.

The stylus 102 includes: a first portion 102a which extends in the upward direction in the figure (the same direction with the detector axis a) from one end having the contact 104; and a second portion 102B which is connected to the first portion 102A at the other end of the first portion 102A and held by the holding part 106.

A stylus axis c as a center axis of the first portion 102A is in parallel with the body axis b. The stylus axis c is arranged on a virtual extension surface S which is a surface extending in the downward direction along an outer peripheral surface of the detector body 100 in the figure (the same direction with the body axis b).

That is, the holding part 106 holds the stylus 102 such that the stylus axis c and the body axis b (the detector axis a) are in parallel with each other, and the stylus axis c and the body axis b (the detector axis a) are offset with each other in a direction (an example of the first direction) perpendicular to the body axis b (the detector axis a) and the rotating shaft 108. The offset amount is equal to a radius of the cylindrical detector body 100.

The second portion 102B includes a third portion 102C and a fourth portion 102D. The third portion 102C is connected to the first portion 102A and extends in the rightward direction in the figure. The fourth portion 102D is connected to the third portion 102C, extends in the upward direction in the figure, and is held by the holding part 106. Here, the first portion 102A and the second portion 102B are integrally formed, but may be formed by different members.

The contact 104 is brought into contact with the work W in a direction from right to left (the X direction) in the figure. A contact point between the contact 104 and the work W exists on the opposite side of the detector body 100 with respect to the virtual extension surface S. That is, a distance in the horizontal direction (the first direction) from the body axis b to the contact point between the contact 104 and the work W is larger than a distance in the horizontal direction from the body axis b to the outer peripheral surface of the detector body 100.

The holding part 106 is provided with the arm part 112 which displaces with rotation of the holding part 106. The holding part 106 rotates/displaces with the rotational displacement of the stylus 102, and this displacement is transmitted via the arm part 112 to the measuring part 110.

The measuring part 110 uses a so-called lever type detector. The measuring part 110 measures a displacement of the contact 104 in the left-and-right direction in the figure based upon a displacement amount of the arm part 112, that is, a rotational displacement amount of the stylus 102, with an unillustrated sensor. For example, the output of the measurement is defined as 0 (zero) in a position where the arm part 112 is in parallel with the detector axis a. In a case where the arm part 112 displaces toward the right side in FIG. 7, a plus value is outputted, and in a case where the arm part 112 displaces toward the left side in FIG. 7, a minus value is outputted.

Herein, there is described a case where the measuring part 110 is a bidirectional detector, but the measuring part 110 is not limited thereto. The measuring part 110 may be composed of a unidirectional detector which has a function to detect only one detection. In this case, a direction of the detector 24 may be changed depending on a direction (an orientation) in which the contact 104 is brought into contact with the measurement surface of the work W.

Figure 8A:
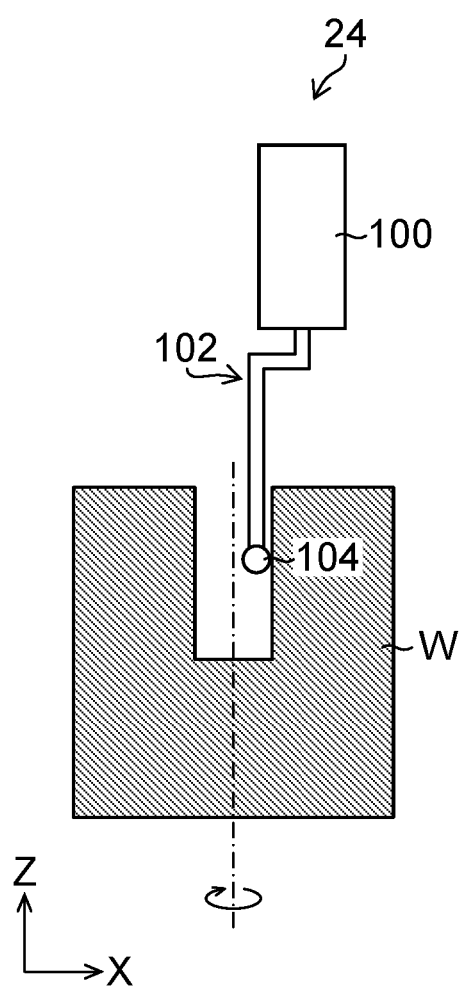
FIG. 8A is a schematic diagram illustrating a roundness measurement of a work.
Figure 8B:
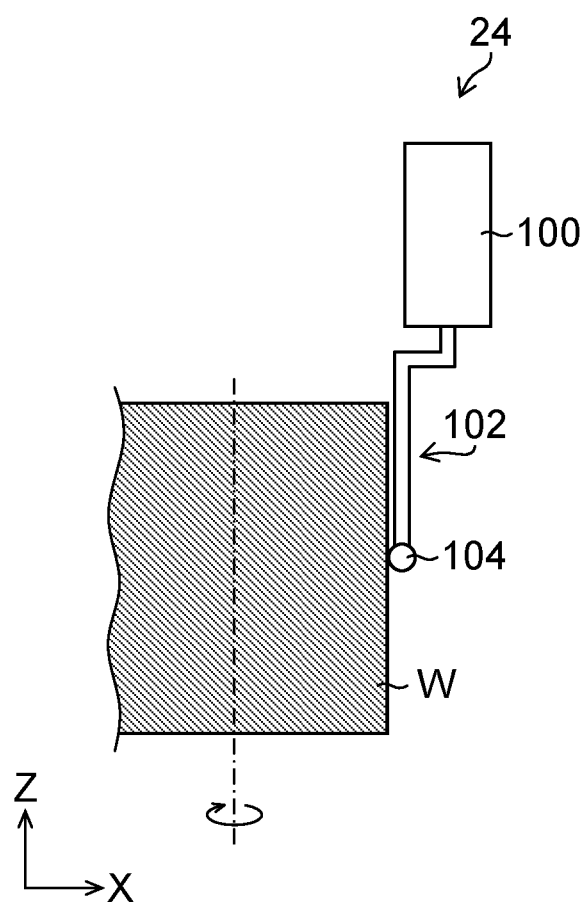
FIG. 8B is a schematic diagram illustrating a roundness measurement of a work.
Figure 8C:
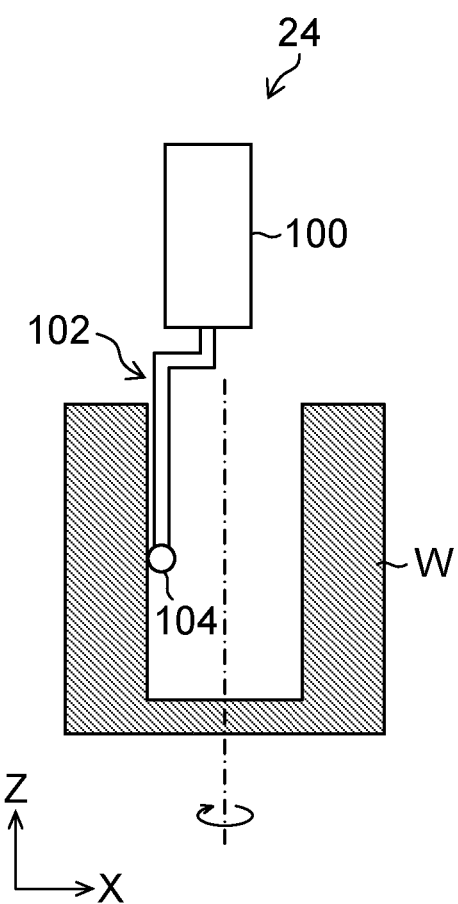
FIG. 8C is a schematic diagram illustrating a roundness measurement of a work.

According to the detector 24 having the above configuration, it is possible to perform the roundness measurement of the narrow-hole inner surface of the work W, the measurement of the outer surface of the columnar work W and the measurement of the inner surface of the cylindrical work W, without changing the attitude of the stylus 102. That is, as illustrated in FIG. 8A, there is no collision between the stylus 102 and the work W in the roundness measurement of the narrow-hole inner surface of the work W, and as illustrated in FIG. 8B and FIG. 8C, there is no collision between the lower end 100A of the detector body 100 and the work W in the measurement of the outer surface and in the measurement of the inner surface of the work W.

Accordingly, since it is unnecessary to manually change the attitude of the detector 24, the plurality of the surfaces of the work W can be automatically measured to shorten the time necessary for the measurement.

Since the contact point $P_1$ (refer to FIG. 6A) between the contact 104 and the work W is always in the same position of the contact 104, the high precision measurement can be maintained regardless of a change of the contact 104 due to wear.

Further, since the arc correction to be described later becomes constant, the high precision measurement can be performed.

Figure 9A:
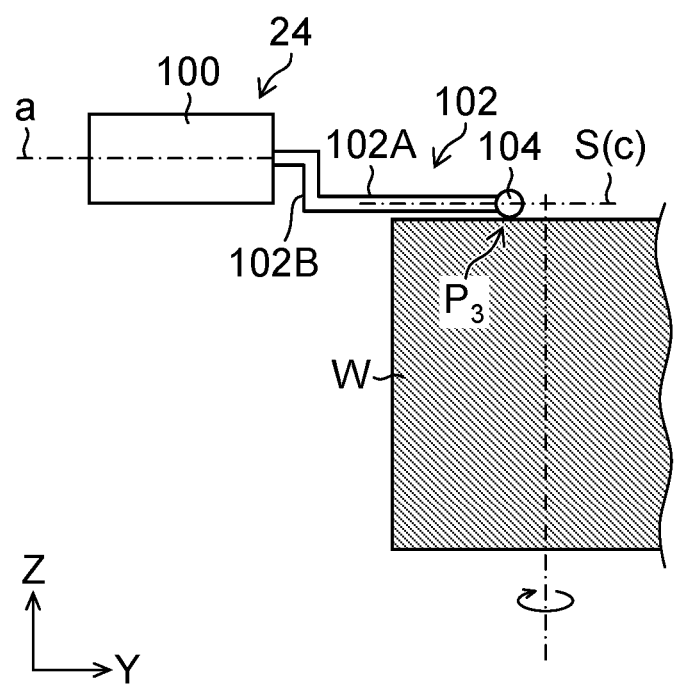
FIG. 9A is an enlarged diagram illustrating a vicinity of the detector at a second attitude.
Figure 9B:
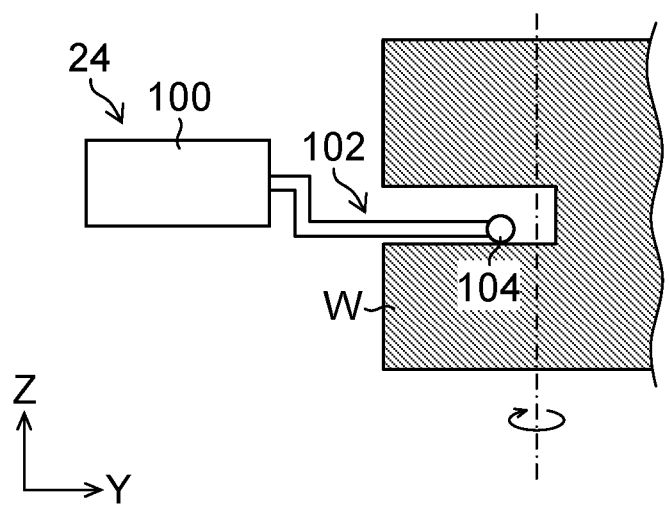
FIG. 9B is an enlarged diagram illustrating a vicinity of the detector at the second attitude.

FIG. 9A and FIG. 9B are enlarged diagrams of the vicinity of the detector 24 in the second attitude. In the second attitude, a detector holder 22 holds the detector 24 in a state where the detector 24 is rotated by 90 degrees from a state illustrated in FIG. 1B and the stylus axis c is offset from the detector axis a in the downward direction. As illustrated in FIG. 9A, the contact 104 comes in contact with the work W in a direction from top to bottom in FIG. 9A (perpendicularly to the detector axis a). The first portion 102A of the stylus 102 extends from the contact 104 in the leftward direction in the figure (in the same direction with the detector axis a) along the upper surface of the work W.

Accordingly, a contact point $P_3$ between the contact 104 and the work W exists on the opposite side of the detector body 100 with respect to the virtual extension surface S which is the extension surface of the outer peripheral surface of the detector body 100 along the rightward direction in the figure.

According to the detector 24 in the second attitude as configured in this way, it is possible to measure not only the upper surface of the work W but also, as illustrated in FIG. 9B, the upper-lower surface of the narrow-groove of the work W. Since the contact point $P_3$ is always in the same position, the measurement is not affected from by the uneven wear.

<Other Embodiments of Detector>

FIG. 10A to FIG. 12D are diagrams respectively illustrating an example of the configuration of a detector 24 according to other embodiments. Components common to those in the detector 24 illustrated in FIG. 7 are referred to as identical reference numerals, and the detailed explanation for them is omitted. In the detectors 24 illustrated in FIG. 10A to FIG. 11C, styluses 102 have shapes different from each other. In the detectors 24 illustrated in FIG. 12A to FIG. 12D, contacts 104 have shapes different from each other.

Figure 10A:
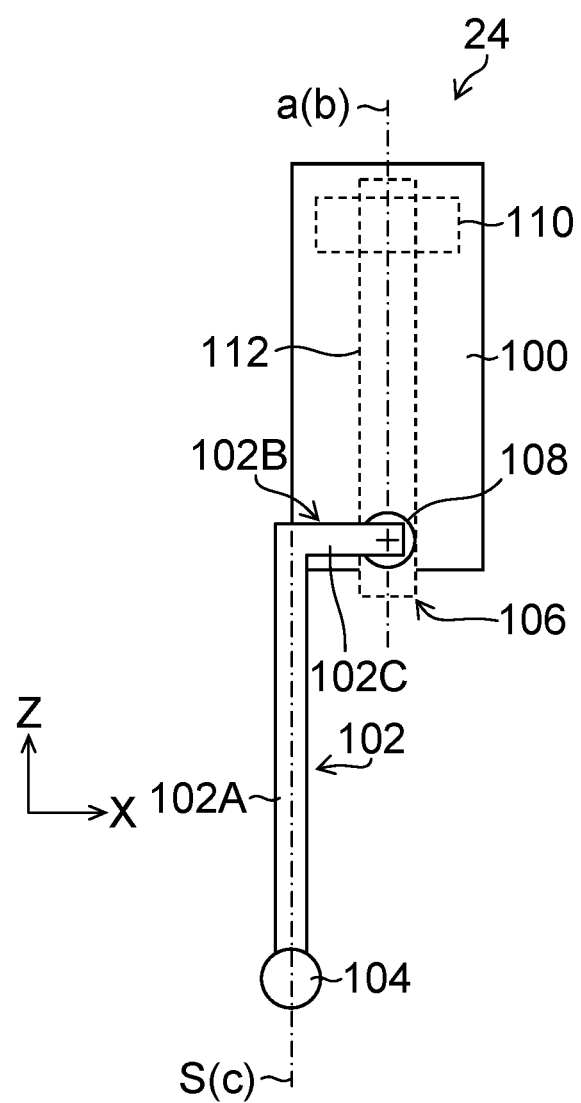
FIG. 10A is a diagram illustrating an example of a configuration of a detector according to another embodiment.

In the stylus 102 of the detector 24 illustrated in FIG. 10A, the second portion 102B includes a third portion 102C which extends in the rightward direction in the figure, and is held by a holding part 106.

Figure 10B:
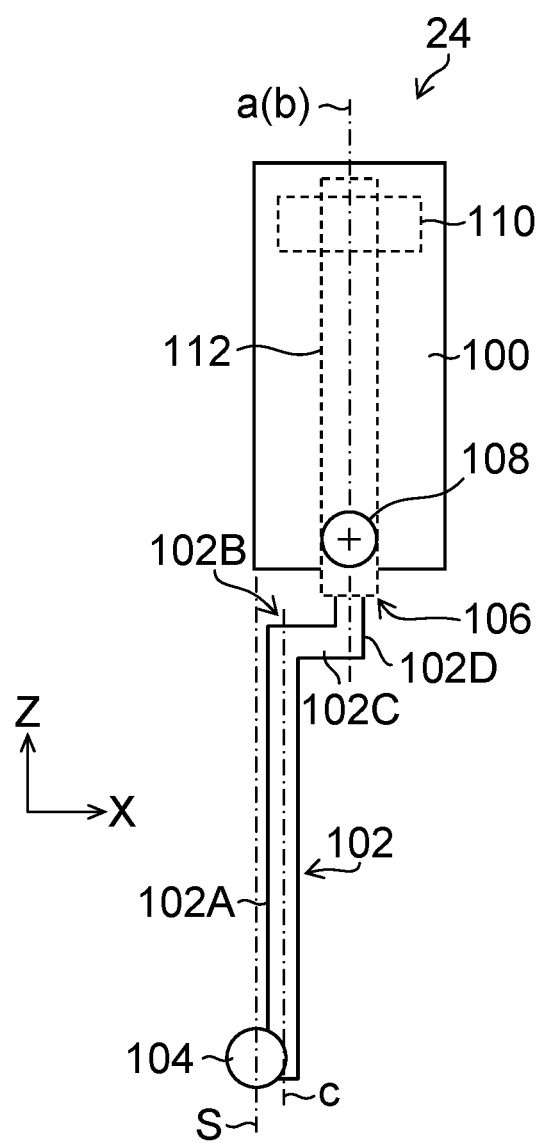
FIG. 10B is a diagram illustrating an example of the configuration of a detector according to another embodiment.

In the stylus 102 of the detector 24 illustrated in FIG. 10B, a first portion 102A is arranged on the holding part 106 side with respect to the virtual extension surface S, and a contact point between the contact 104 and the work W exists on the opposite side of the detector body 100 with respect to the virtual extension surface S.

Figure 10C:
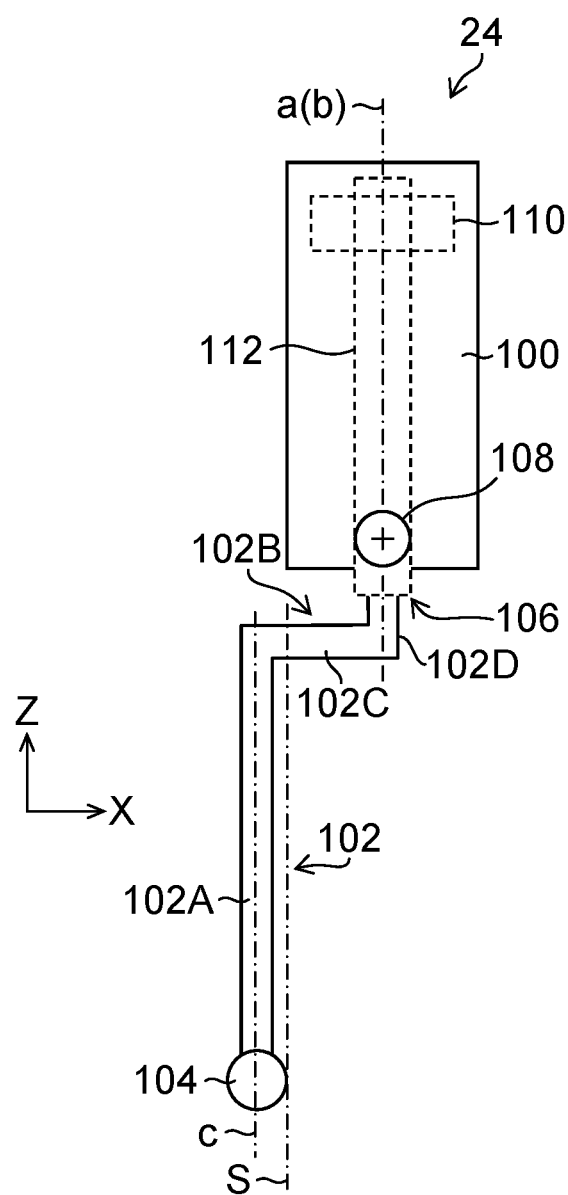
FIG. 10C is a diagram illustrating an example of the configuration of a detector according to another embodiment.

In the stylus 102 of the detector 24 illustrated in FIG. 10C, a third portion 102C is longer than the third portion 102C of the detector 24 illustrated in FIG. 7. That is, an offset amount between the stylus axis c and the body axis b is larger than the detector 24 illustrated in FIG. 7.

Figure 11A:
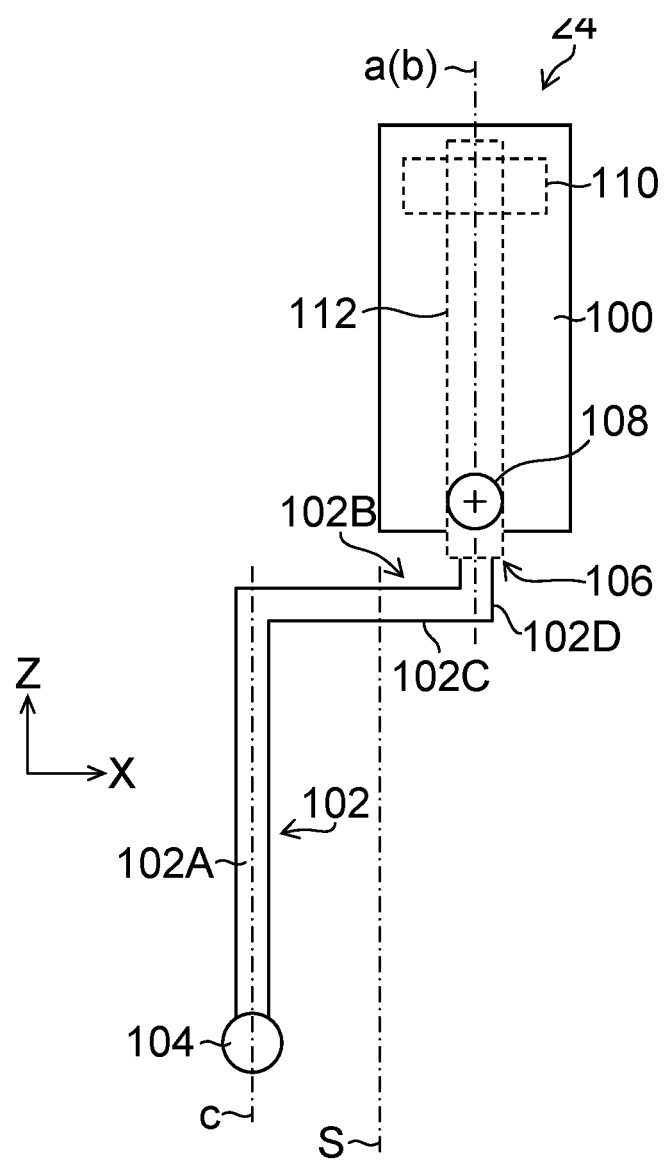
FIG. 11A is a diagram illustrating an example of the configuration of a detector according to another embodiment.

In the stylus 102 of the detector 24 illustrated in FIG. 11A, a third portion 102C is longer than the third portion 102C of the detector 24 illustrated in FIG. 10C.

When a distance from the virtual extension surface S to the contact point $P_1$ (refer to FIG. 6A) between the contact 104 and the work W is large, an influence of the arc correction to be described later becomes large. Therefore, the measurement precision deteriorates. Accordingly, it is preferable that the contact point $P_1$ exists on the opposite side of the detector body 100 with respect to the virtual extension surface S and the distance from the virtual extension surface S to the contact point $P_1$ is as small as possible.

Figure 11B:
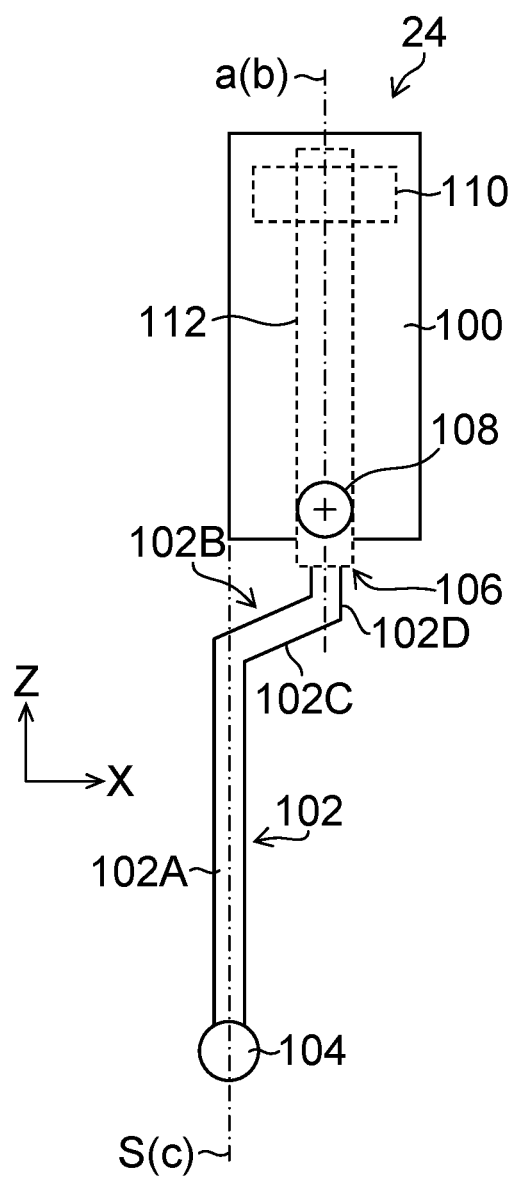
FIG. 11B is a diagram illustrating an example of the configuration of a detector according to another embodiment.
Figure 11C:
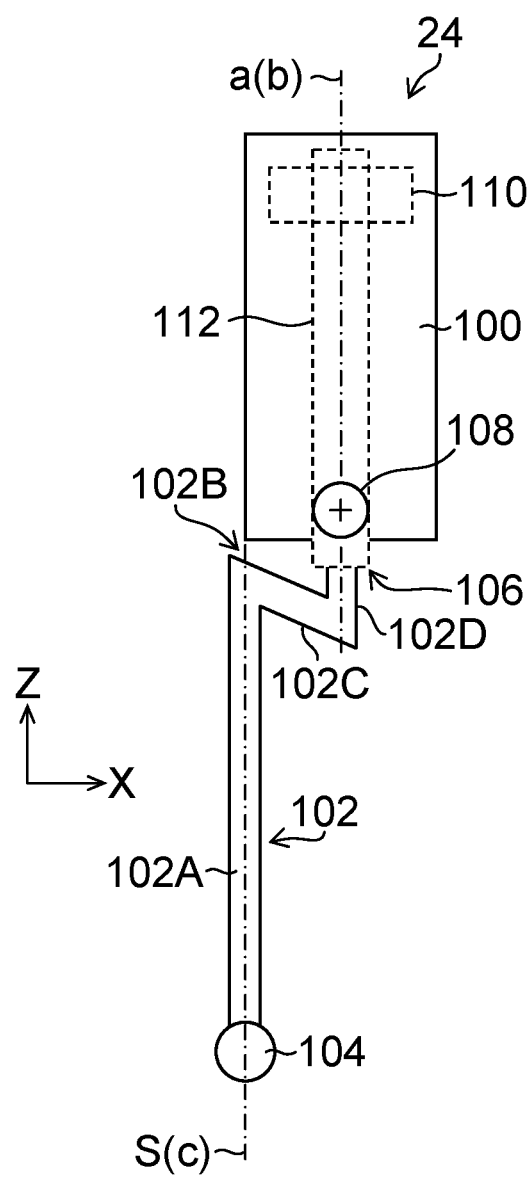
FIG. 11C is a diagram illustrating an example of the configuration of a detector according to another embodiment.

In the stylus 102 of the detector 24 illustrated in FIG. 11B, a third portion 102C extends in the right-upward direction in the figure toward a fourth portion 102D from a first portion 102A. In the stylus 102 of the detector 24 illustrated in FIG. 11C, a third portion 102C extends in the right-downward direction in the figure toward a fourth portion 102D from a first portion 102A. In this way, the extending direction of the third portion 102C is not required to be a direction parallel to the X direction.

In the stylus 102 of the detector 24 illustrated in FIG. 12A to FIG. 12D, a first portion 102A is arranged on the holding part 106-side with respect to the virtual extension surface S, and a part of the contact 104 exists on the opposite side of the detector body 100 with respect to the virtual extension surface S.

Figure 12A:
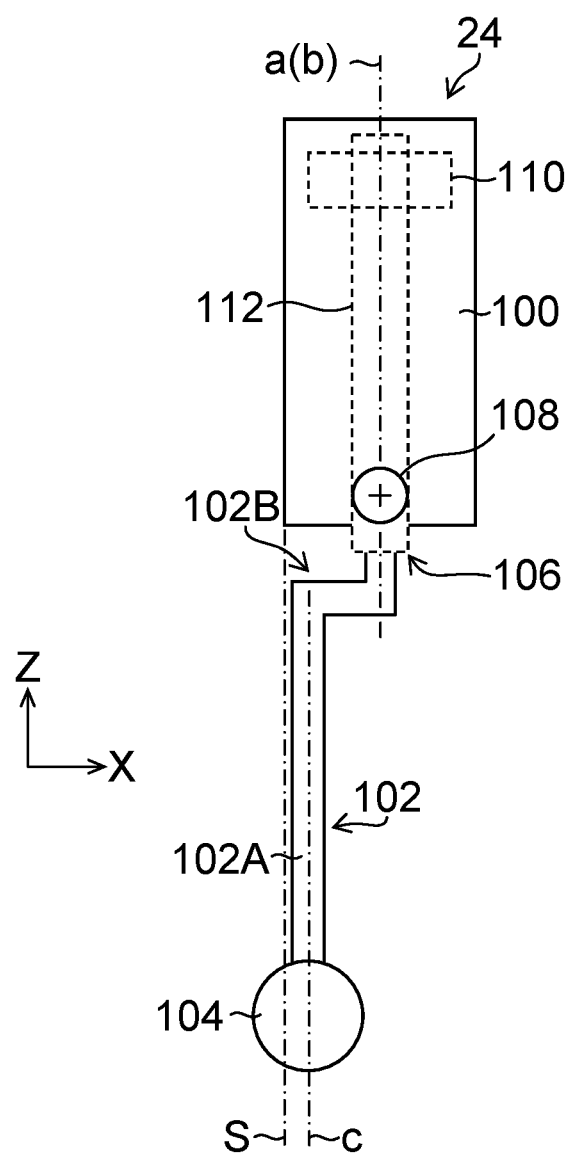
FIG. 12A is a diagram illustrating an example of the configuration of a detector according to another embodiment.

A contact 104 of the detector 24 illustrated in FIG. 12A is formed into a substantially spherical shape, and is larger in diameter than the contact 104 of the detector 24 illustrated in FIG. 7.

Figure 12B:
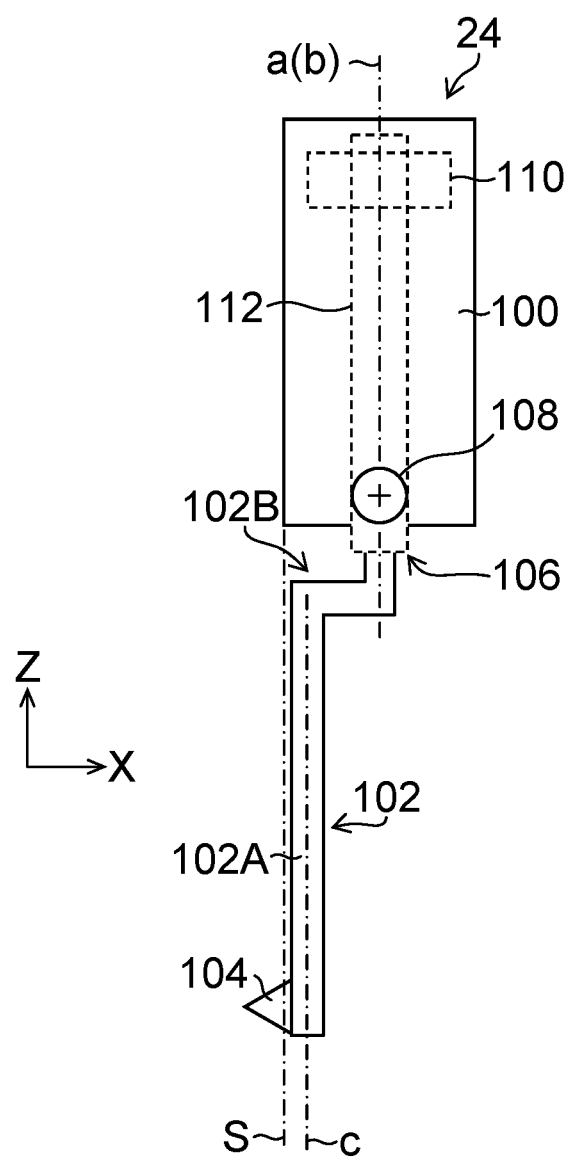
FIG. 12B is a diagram illustrating an example of the configuration of a detector according to another embodiment.

A contact 104 of the detector 24 illustrated in FIG. 12B is formed into a triangular pyramid shape, and an apex of the contact 104 exists on the opposite side of the detector body 100 with respect to the virtual extension surface S. Here, the contact 104 is formed into the triangular pyramid shape, but may be formed into a conical shape or into a polygon pyramid shape.

Figure 12C:
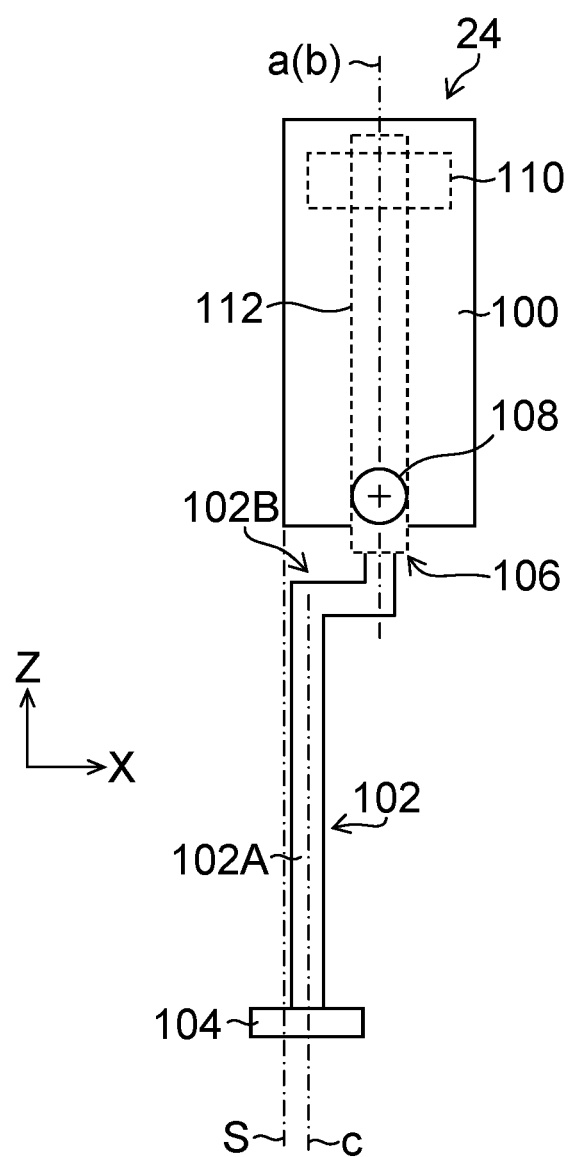
FIG. 12C is a diagram illustrating an example of the configuration of a detector according to another embodiment.
Figure 12D:
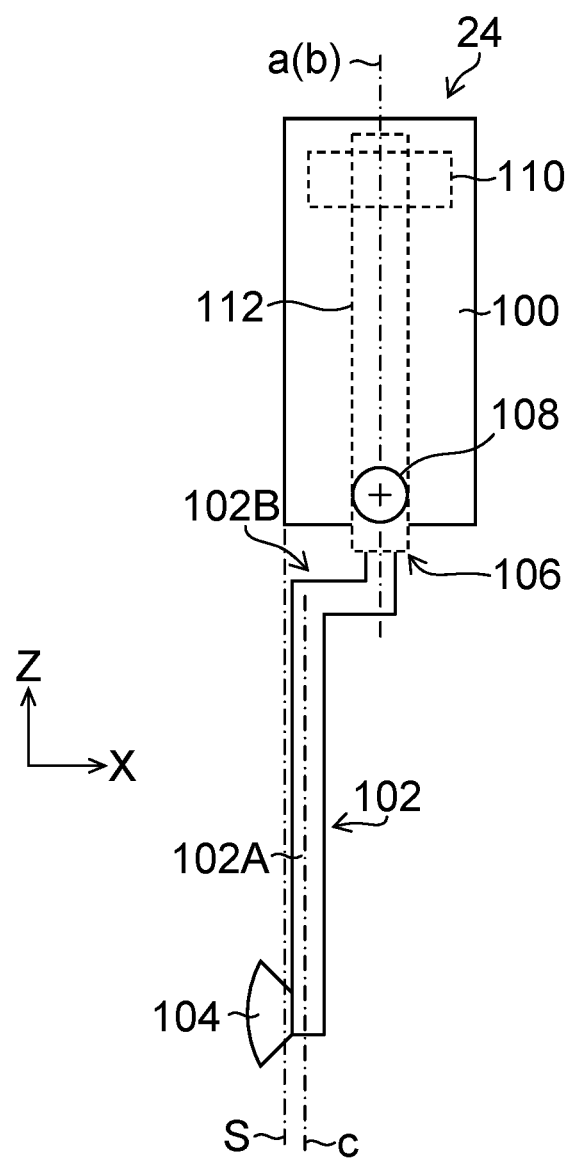
FIG. 12D is a diagram illustrating an example of the configuration of a detector according to another embodiment.

A contact 104 of the detector 24 illustrated in FIG. 12C is formed into a disc shape, and a contact 104 of the detector 24 illustrated in FIG. 12D is formed into an ax blade shape (a fan shape).

Even in the detectors 24 illustrated in FIG. 10A to FIG. 12D, it is possible to perform the roundness measurement of the narrow-hole inner surface of the work W, the measurement of the outer surface of the columnar work W and the measurement of the inner surface of the cylindrical work W, without changing the attitude. Accordingly, the plurality of the surfaces of the work W can be automatically measured to shorten the time necessary for the measurement.

Figure 13:
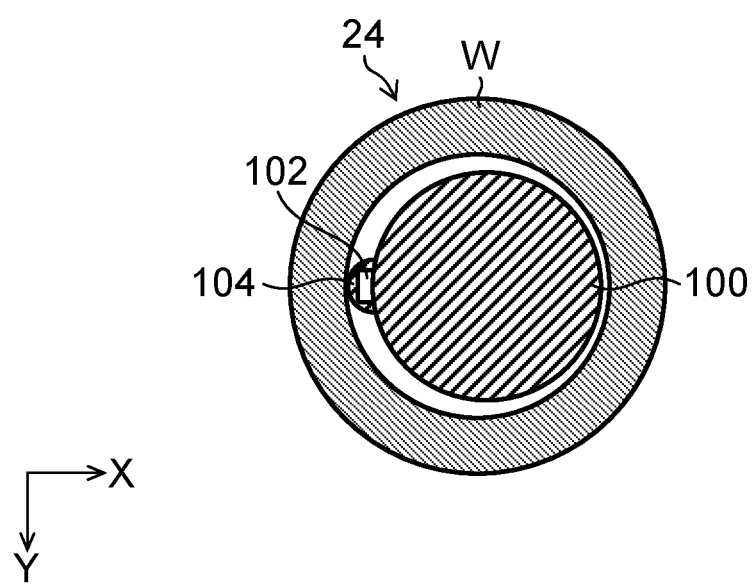
FIG. 13 is a top view illustrating measurement of an inner surface of a cylindrical work.

The shape of the detector body 100 is preferably formed into a cylindrical shape having a diameter as small as possible. FIG. 13 is a top view of FIG. 8C illustrating the measurement of the inner surface of the cylindrical work W. As illustrated in FIG. 13, the detector body 100 enters the inside of the cylindrical work W so that the measurement of the bottom (in the downward direction in FIG. 8C) of the inner surface is made possible.

The shape of the detector body 100 may be a polygon columnar shape, a cylindrical shape having a small projection, or the like.

<Arc Correction>

Figure 14:
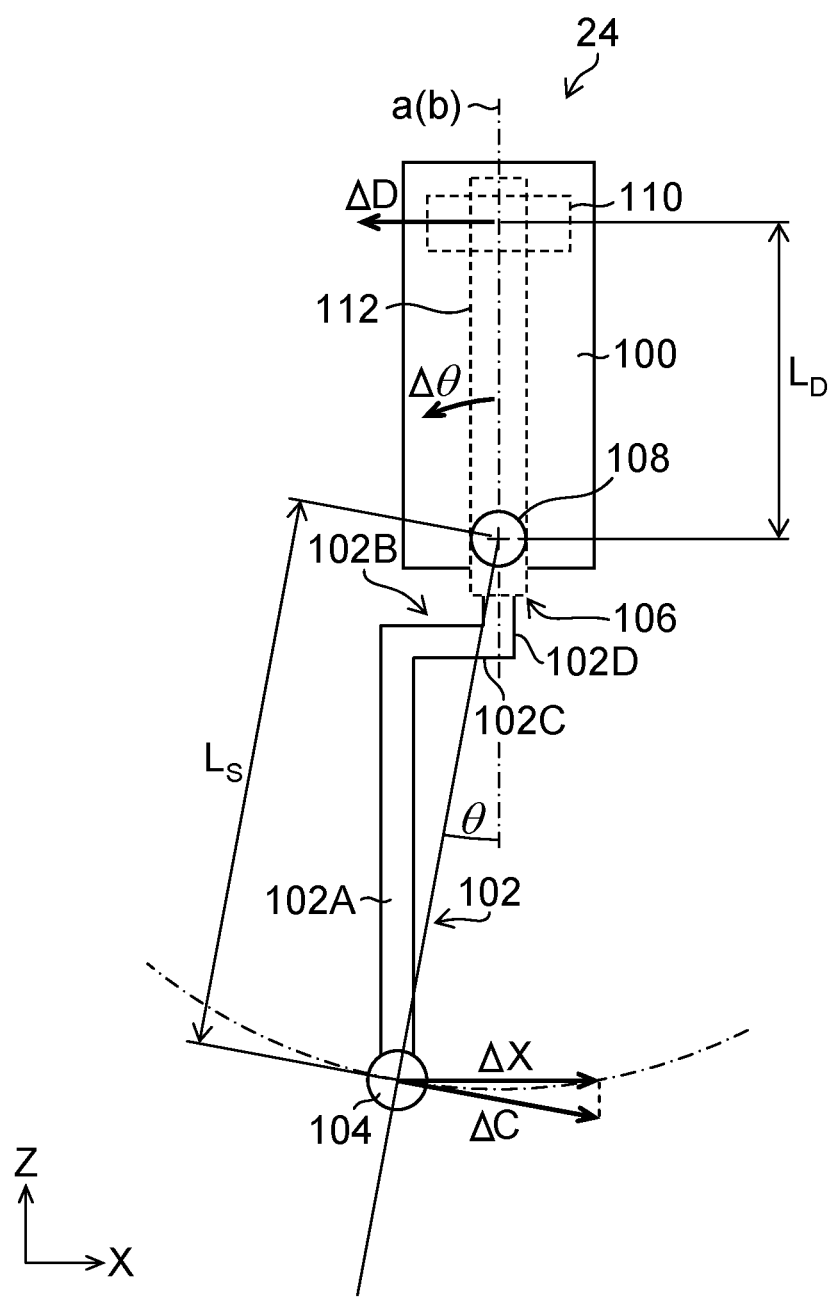
FIG. 14 is a diagram explaining arc correction of a detector.

FIG. 14 is a diagram explaining an arc correction of the detector 24.

Static parameters of the detector 24 include: θ which is an angle formed by the vertical axis (the Z direction) and a straight line connecting the center of the contact 104 with the rotating shaft 108; $L_D$ which is a distance between the rotating shaft 108 and the measuring part 110; and $L_S$ which is a distance between the center of the contact 104 and the rotating shaft 108.

Further, displacement parameters generated by contact between the contact 104 and the work W, include: ΔD which is a displacement in the X direction observed by the measuring part 110; Δθ which is a displacement angle of the arm part 112; ΔC which is a displacement of the contact 104 in the rotating direction; and ΔX which is an X direction component of the displacement of the contact 104.

The detector 24 obtains ΔX of the X direction component of the displacement of the contact 104, from ΔD of the displacement in the X direction observed by the measuring part 110.

The following relation expressions are established in relation to these parameters.

$$\Delta\theta = \Delta D/L_D \quad \text{(Expression 1)}$$

$$\Delta\theta = \Delta C/L_S \quad \text{(Expression 2)}$$

$$\Delta X = \Delta C \times \cos\theta \quad \text{(Expression 3)}$$

The following expression is established according to Expressions 1 to 3.

$$\Delta X = \Delta D \times (L_S/L_D) \times \cos\theta \quad \text{(Expression 4)}$$

Herein, cos θ is the term of the arc correction.

In a case of using the lever type detector as the measuring part 110, the contact 104 does not perform a linear motion, but exactly, performs a circular motion. With the correction (the arc correction) of the effect due to this circular motion, the measurement can be performed with higher precision.

In the conventional detector 24, it is necessary to perform this arc correction depending on the attitude change of the stylus 102. In particular, in a case of manually performing the attitude change, it is necessary to perform the arc correction depending on a difference in a set angle for each time.

According to the detector 24 in the present embodiment, it is not necessary to perform the attitude change of the stylus 102, and by always performing the same arc correction, it is possible to easily realize higher-precision measurement.

<Parallel Link Mechanism Detector>

To here, the explanation is made about a case of using the lever type detector as the measuring part 110, but the measuring part 110 is not limited to the lever type detector. For example, a parallel link mechanism detector may be used.

Figure 15:
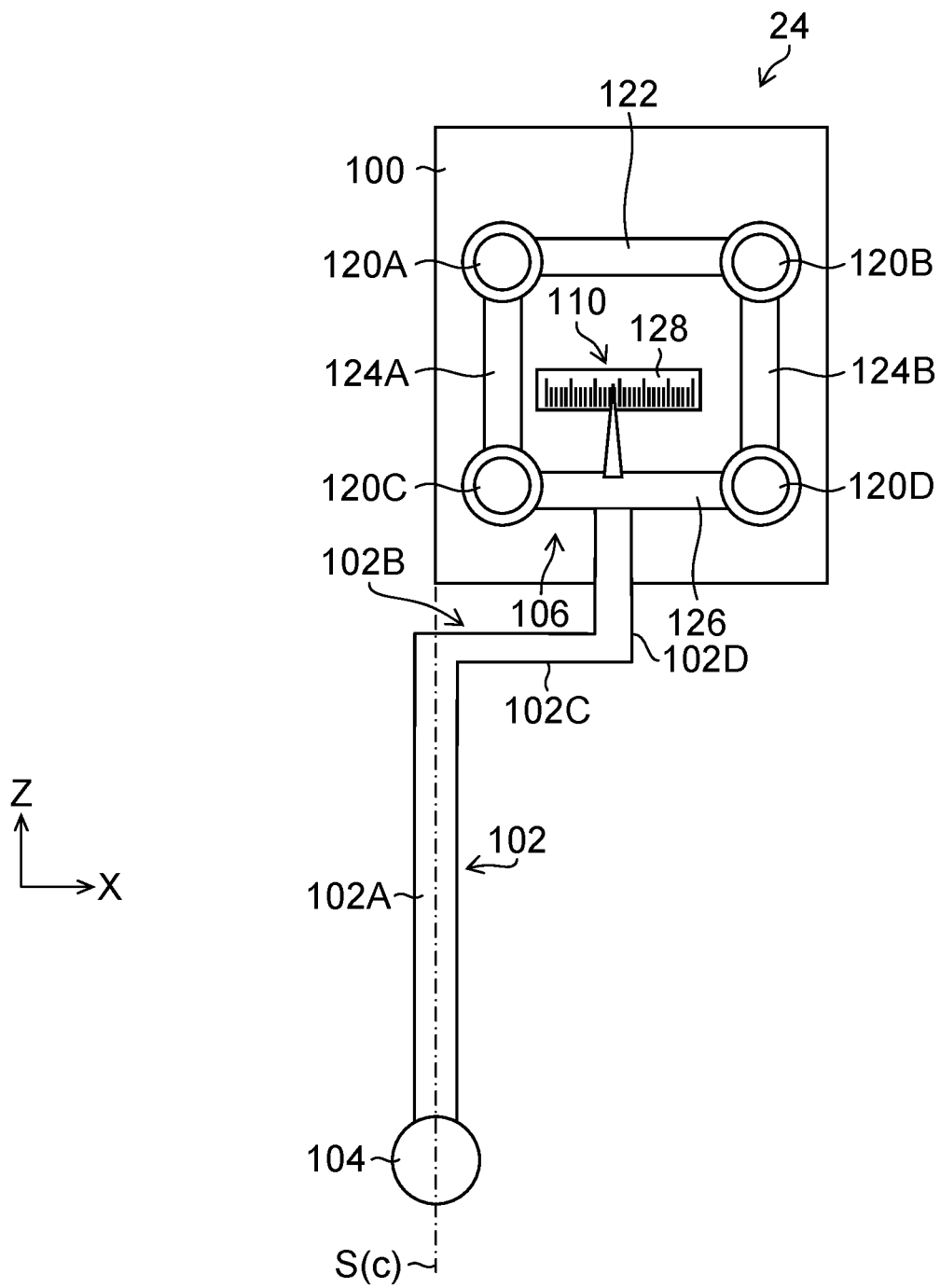
FIG. 15 is a diagram illustrating an example of a configuration of a detector using a parallel link mechanism.

FIG. 15 is a diagram illustrating an example of the configuration of a detector 24 using a parallel link mechanism as a measuring part 110.

As illustrated in FIG. 15, the detector 24 includes a cylindrical detector body 100, a stylus 102, a contact 104, rotating shafts 120A, 120B, 120C, 120D, a fixed link 122, movable links 124A, 124B, a swinging link 126 and a displacement sensor 128.

The detector body 100 is formed into a cylindrical shape along a Z direction. The stylus 102 is urged in a leftward direction in the figure, by an unillustrated spring inside of the detector body 100.

The stylus 102 extends from the detector body 100. The stylus 102 is provided with the contact 104 at the tip end thereof.

The stylus 102 includes: a first portion 102A which extends from the contact 104 in an upward direction in the figure (in the same direction with a detector axis a); and a second portion 102B which is connected to the first portion 102A and is held by the swinging link 126.

The first portion 102A extends to reach a virtual extension surface S which is an extension surface of an outer peripheral surface of the detector body 100 along a downward direction in the figure. The second portion 102B includes: a third portion 102C which is connected to the first portion 102A and extends in a rightward direction in the figure; and a fourth portion 102D which is connected to the third portion 102C and extends in the upward direction in the figure to be held by a holding part 106.

The contact 104 comes in contact with the work W in a direction from right to left in the figure. A contact point between the contact 104 and the work W exists on the opposite side of the detector body 100 with respect to the virtual extension surface S.

The fixed link 122 is fixed to the pair of the rotating shafts 120A and 120B provided at both ends of the fixed link 122. One ends of the pair of the movable links 124A and 124B respectively are rotatably supported by the rotating shafts 120A and 120B.

The other ends of the movable links 124A and 124B are provided with the rotating shafts 120C and 120D. Both ends of the swinging link 126 are swingably supported by the rotating shafts 120C and 120D. The swinging link 126 acts as the holding part 106 configured to hold the fourth portion 102D of the stylus 102. Accordingly, the contact point between the contact 104 and the work W exists on the opposite side of the detector body 100 with respect to the virtual extension surface S.

Figure 16:
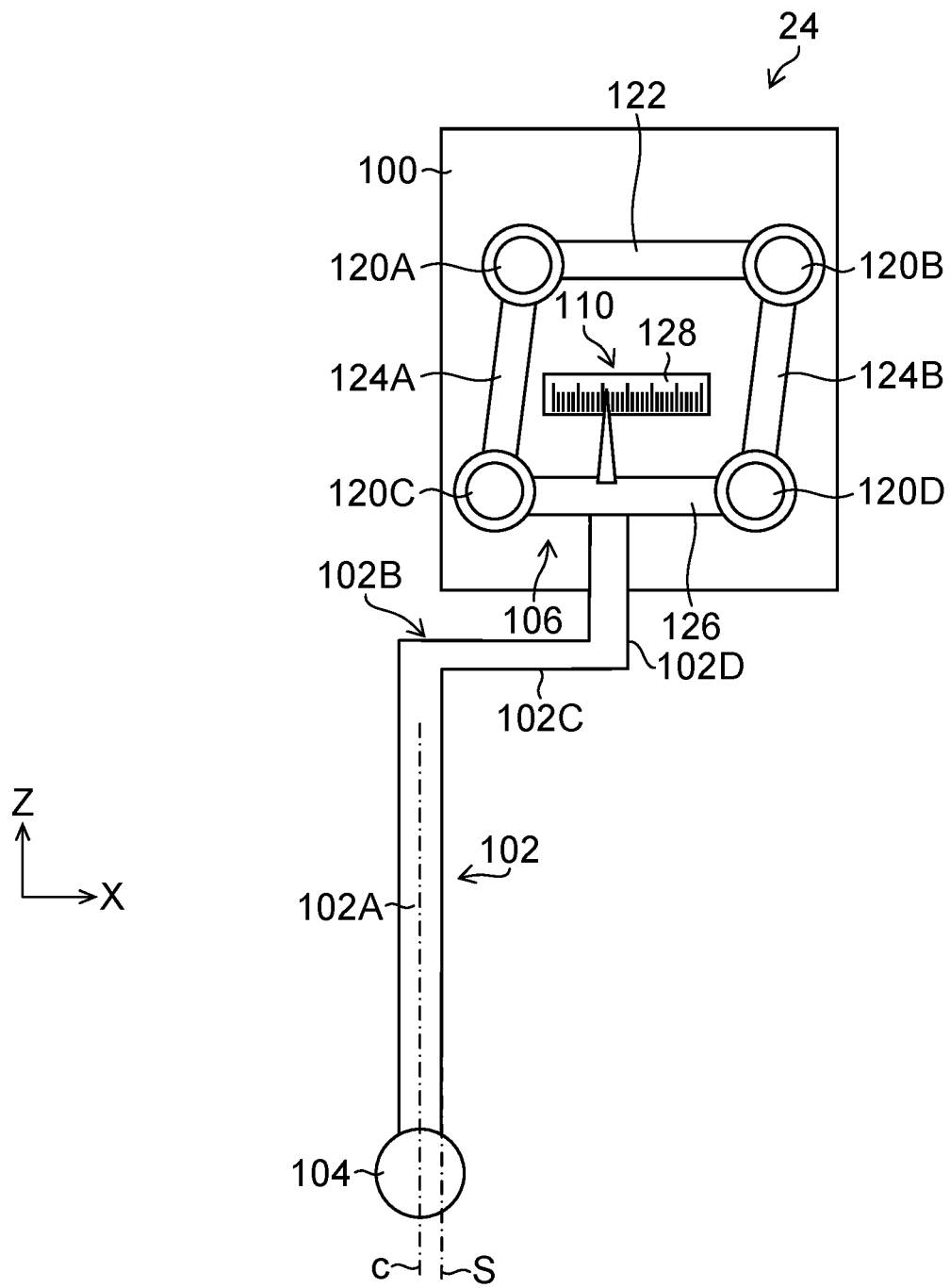
FIG. 16 is a diagram illustrating an example of the configuration of the detector using the parallel link mechanism.

The displacement sensor 128 acts as the measuring part 110 configured to measure a displacement of the contact 104 in the left-and-right direction in the figure based upon a swinging amount of the swinging link 126. As illustrated in FIG. 16, when the contact 104 displaces in the X direction, the swinging link 126 swings in the X direction, while the shape formed with the fixed link 122, the movable links 124A and 124B and the swinging link 126 maintains a parallelogram. The displacement sensor 128 measures the displacement of the contact 104 in the left-and-right direction in the figure based upon the swinging amount of the swinging link 126.

In this way, also in the detector 24 using the parallel link mechanism, the contact point between the contact 104 and the work W exists on the opposite side of the detector body 100 with respect to the virtual extension surface S. Therefore, it is possible to perform the roundness measurement of the narrow-hole inner surface of the work W, the measurement of the outer surface of the columnar work W and the measurement of the inner surface of the cylindrical work W, without changing the attitude of the stylus 102. Accordingly, the plurality of the surfaces of the work W can be automatically measured to shorten the time necessary for the measurement.

Since the contact point $P_1$ (refer to FIG. 6A and FIG. 6B) between the contact 104 and the work W is always in the same position of the contact 104, the high precision measurement can be maintained regardless of a change of the contact 104 due to wear.

<Specific Effect in Roundness Measuring Machine>

The detector 24 as explained so far can be applied to the surface property measuring machine. However, when the detector 24 is used particularly for the roundness measuring machine, the following specific effect can be achieved.

When measurement is performed in an attitude in which a direction where the detector axis a and the first portion 102A of the stylus 102 extend is substantially in parallel with a rotating direction (a rotating shaft of the detector 24 in a detector rotating type) of the rotating stage 14 of the work W, it becomes possible to measure the narrow-hole of the work W. Particularly, it is possible to measure a deep position of a relatively small inner diameter, and further, it is possible to measure an outer diameter.

When measurement is performed in an attitude in which a direction where the detector axis a and the first portion 102A of the stylus 102 extend is substantially orthogonal to the rotating direction (the rotating shaft of the detector 24 in the detector rotating type) of the rotating stage 14, it becomes possible to measure a narrow groove on a side surface of the work W and an upper surface of the work W.

In the roundness measuring machine 10, it is necessary to perform measurement at the measurement position which is on a line passing through the center of the cylindrical work W. This feature also achieves the following specific effect.

Figure 17:
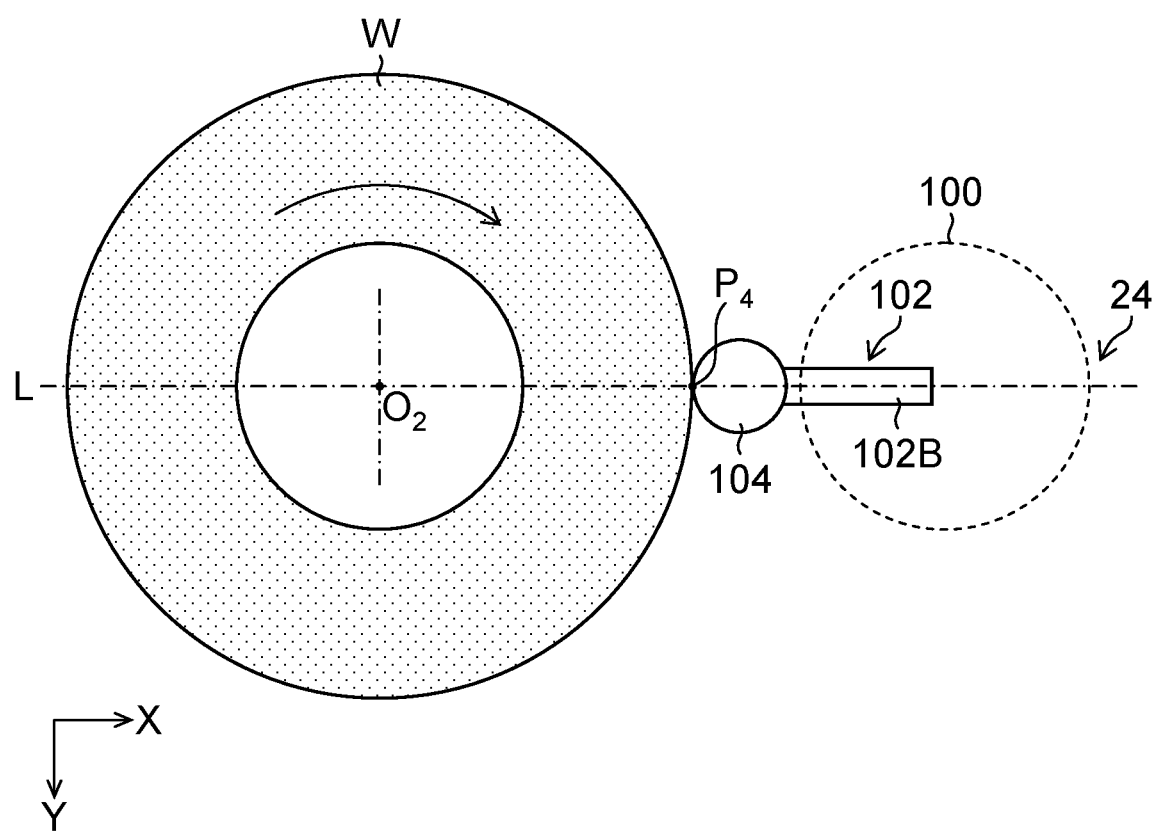
FIG. 17 is a top view illustrating measurement of an outer surface of a columnar work.

FIG. 17 is a top view of the measurement of the outer surface of the columnar work W illustrated in FIG. 8B. As illustrated in FIG. 17, a contact point $P_4$ between the contact 104 and the work W exists on a straight line L passing through a center $O_2$ of the work W and in parallel with the X direction.

Herein, the following explanation will be made with reference to FIG. 18A and FIG. 18B, for a case where the conventional detector 24 is used and the attitude of stylus 102 has been changed so that the stylus axis c (hereinafter, an attitude changed axis) of the stylus 102 is inclined with respect to the straight line L.

Figure 18A:
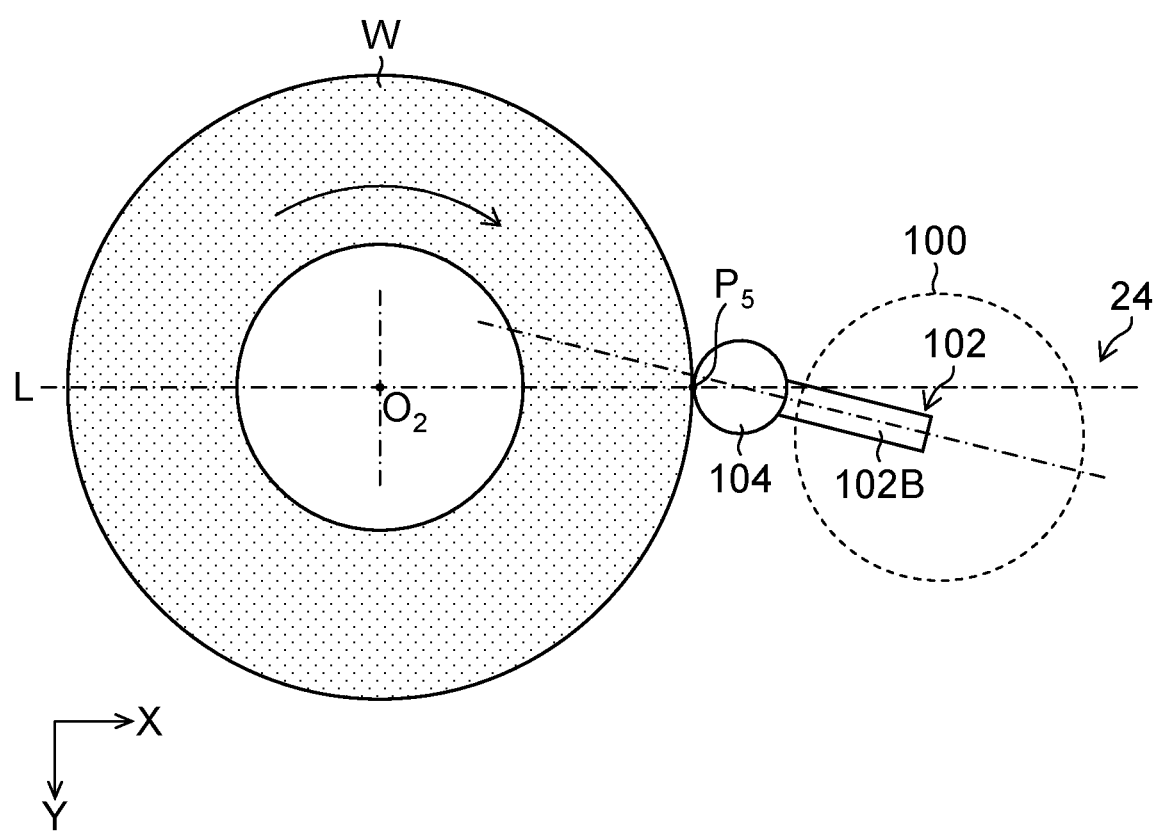
FIG. 18A is a top view illustrating measurement of a work by a conventional detector.

FIG. 18A is a top view of the measurement of the outer surface of the work W illustrated in FIG. 5A. As illustrated in FIG. 18A, a contact point $P_5$ between the contact 104 and the work W exists on a straight line L which passes through a center $O_2$ of the work W and is in parallel with the X direction.

Figure 18B:
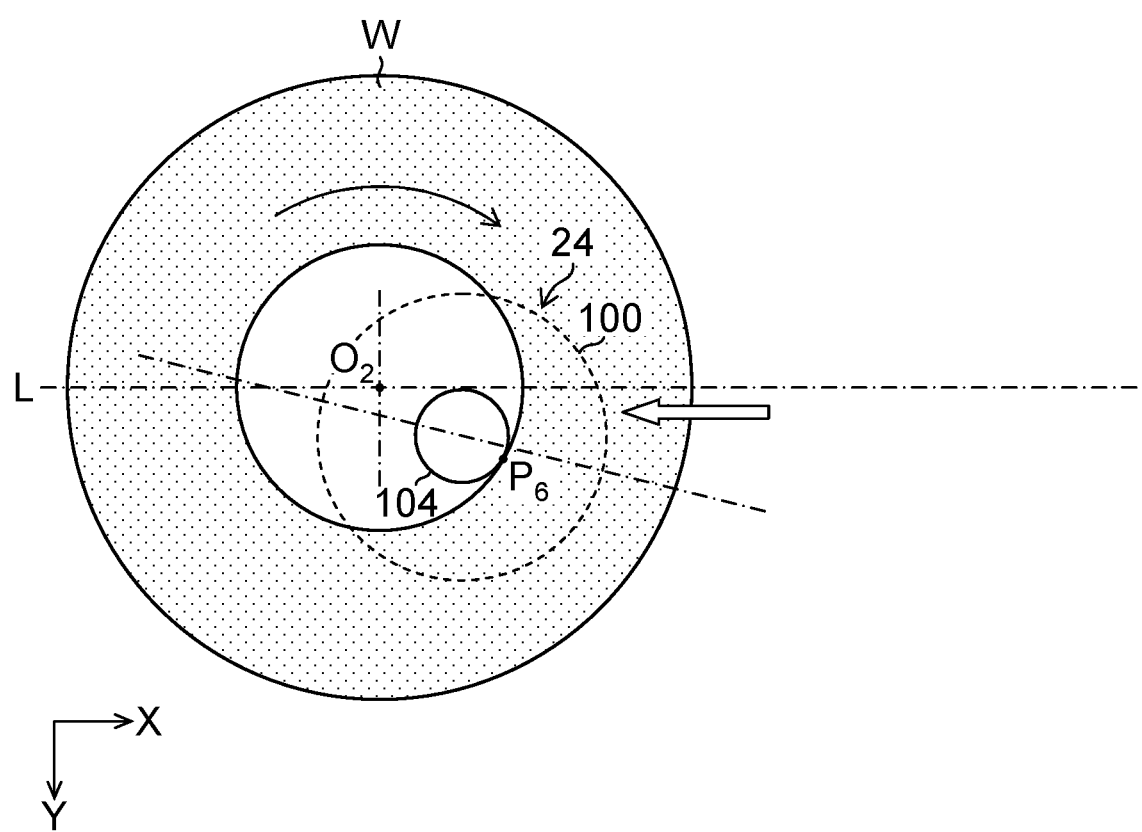
FIG. 18B is a top view illustrating measurement of the work by the conventional detector.

On the other hand, FIG. 18B is a top view of the measurement of the inner surface of the work W illustrated in FIG. 3C. Herein, after the attitude change, the axis of the stylus 102 is inclined with respect to the straight line L. Therefore, as illustrated in FIG. 18B, a contact point $P_6$ between the contact 104 and the work W is positioned out of the straight line L.

Thus, in a case where the attitude is changed so that the axis of the stylus 102 is inclined with respect to the straight line L, there is a problem that the measurement position is changed due to the attitude change of the stylus 102.

Meanwhile, the explanation will be made with reference to FIG. 19A and FIG. 19B, for a case where the detector 24 according to the present embodiment is used and a direction in which the second portion 102B of the stylus 102 extends on the XY plane is inclined with respect to the straight line L.

Figure 19A:
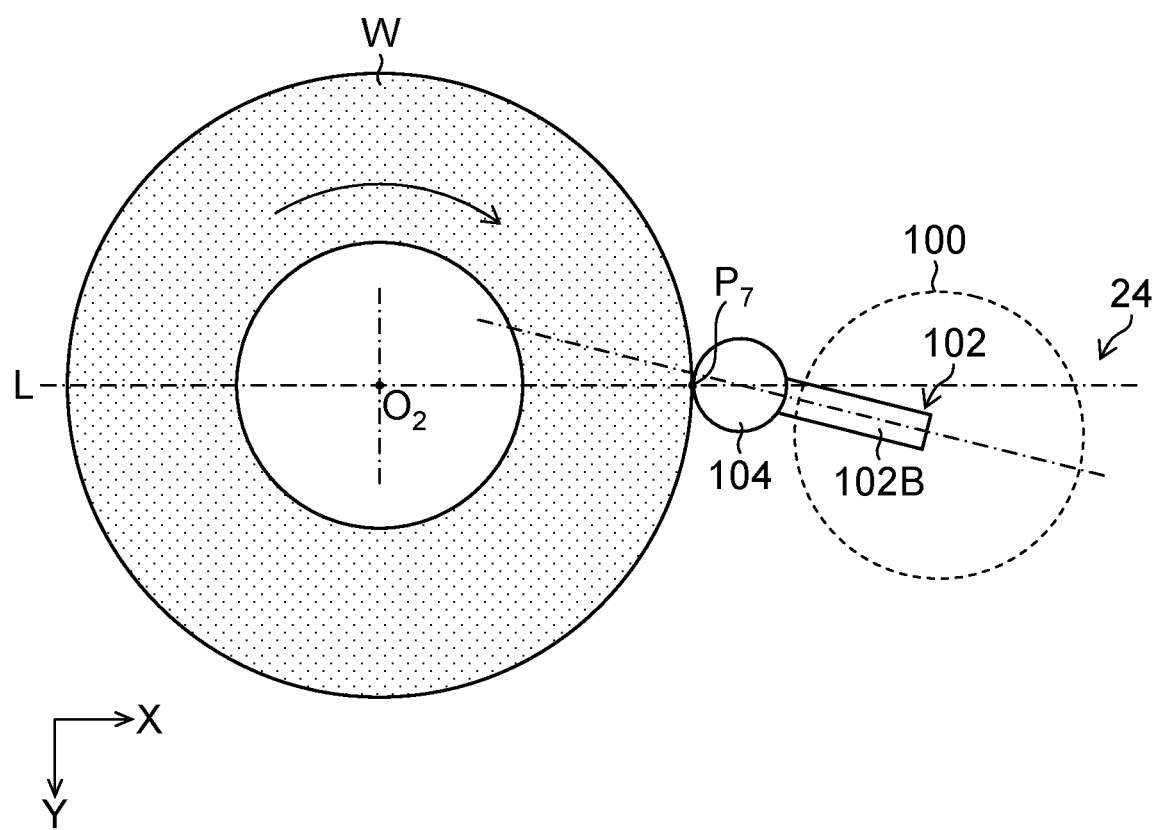
FIG. 19A is a top view illustrating measurement of a work by a detector according to the present embodiment.

FIG. 19A is a top view of the measurement of the outer surface of the work W illustrated in FIG. 8B. As illustrated in FIG. 19A, a contact point $P_7$ between the contact 104 and the work W exists on a straight line L.

Figure 19B:
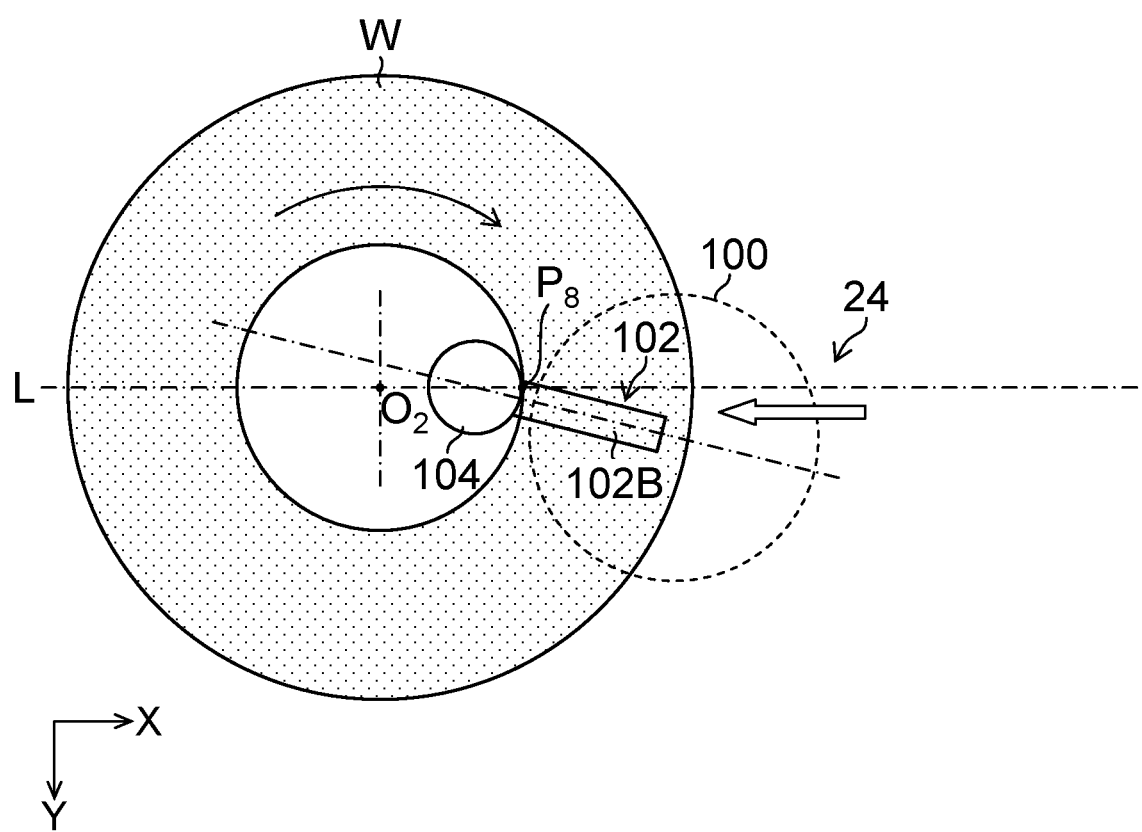
FIG. 19B is a top view illustrating measurement of the work by the detector according to the present embodiment.

In addition, FIG. 19B is a top view of the measurement of the inner surface of the work W illustrated in FIG. 8C. As illustrated in FIG. 19B, a contact point $P_8$ between the contact 104 and the work W exists on the straight line L, because the work W moves in parallel with the X direction from a position of the detector 24 illustrated in FIG. 19A.

In this way, since the attitude change of the stylus 102 is made unnecessary, there is no instability deriving from the measurement position's change. Consequently, the time for the measurement position adjustment can be reduced, and the measurement precision can be improved.

<Others>

The technical scope of the present invention is not limited to the above described embodiments. The components and the like in the respective embodiments may be combined between the respective embodiments as needed within a scope not departing from the subject of the present invention.

REFERENCE SIGNS LIST

10 Roundness measuring machine
12 Body base
14 Rotating stage
16 Column
18 Carriage
20 Arm
22 Detector holder
24 Detector
100 Detector body
100A Lower end
102 Stylus
102A First portion
102B Second portion
102C Third portion
102D Fourth portion
104 Contact
106 Holding part
108 Rotating shaft
110 Measuring part
112 Arm part
120A Rotating shaft
120B Rotating shaft
120C Rotating shaft
120D Rotating shaft
122 Fixed link
124A Movable link
124B Movable link
126 Swinging link
128 Displacement sensor
$O_1$ Center
$O_2$ Center
$P_1$ Contact point
$P_2$ Contact point
$P_3$ Contact point
$P_4$ Contact point
$P_5$ Contact point
$P_6$ Contact point
$P_7$ Contact point
$P_8$ Contact point
S Virtual extension surface
W Work
a Detector axis
b Body axis
c Stylus axis

The invention claimed is:

1. A detector comprising:
a stylus configured to support a contact which is brought into contact with a surface of an object to be measured;
a holder configured to hold the stylus;
a measuring part configured to swingably hold the holder with a rotating shaft and detect a displacement of the holder; and
a body configured to accommodate the measuring part, the body having a cylindrical shape;
wherein the holder holds the stylus such that a stylus axis being a longitudinal axis of the stylus and a body axis being a longitudinal axis of the body are in parallel with each other, and the stylus axis and the body axis are offset in a first direction orthogonal to the body axis and a longitudinal axis of the rotating shaft, and
a distance in the first direction between the body axis and a position where the contact is brought into contact with the object to be measured is larger than a distance in the first direction between the body axis and an outer peripheral surface of the body.

2. The detector according to claim 1, wherein the body is formed into a cylindrical shape.

3. A detector comprising:
a stylus configured to support a contact which is brought into contact with a surface of an object to be measured;
a holder configured to hold the stylus;
a measuring part configured to swingably hold the holder with a rotating shaft and detect a displacement of the holder; and
a body configured to accommodate the measuring part, the body having a cylindrical shape;
wherein the holder holds the stylus such that a stylus axis being a longitudinal axis of the stylus and a body axis being a longitudinal axis of the body are in parallel with each other, and the stylus axis and the body axis are offset in a first direction orthogonal to the body axis and a longitudinal axis of the rotating shaft.

4. The detector according to claim 1, wherein the measuring part supports the holder rotatably around the rotating shaft.

5. The detector according to claim 1, wherein the measuring part includes a parallel link mechanism comprising:
a fixed link having a pair of rotating shafts;
a pair of movable links one ends of which are respectively supported to be rotatable by the pair of the rotating shafts; and
a swinging link configured to hold the stylus, the swinging link being swingably supported by rotating shafts which are respectively provided in another ends of the pair of the movable links.

6. A detector comprising:
a stylus configured to support a contact which is brought into contact with a surface of an object to be measured;
a holder configured to hold the stylus;
a measuring part configured to swingably hold the holder with a rotating shaft and detect a displacement of the holder; and
a body configured to accommodate the measuring part, the body having a cylindrical shape;
wherein the holder holds the stylus such that a stylus axis being a longitudinal axis of the stylus and a body axis being a longitudinal axis of the body are in parallel with each other, and the stylus axis and the body axis are offset in a first direction orthogonal to the body axis and a longitudinal axis of the rotating shaft, and
wherein the measuring part includes a parallel link mechanism comprising:
a fixed link having a pair of rotating shafts;
a pair of movable links one ends of which are respectively supported to be rotatable by the pair of the rotating shafts; and
a swinging link configured to hold the stylus, the swinging link being swingably supported by the rotating shafts which are respectively provided in another ends of the pair of the movable links.

7. The detector according to claim 1, wherein a shape of the contact is any one of a spherical shape, a conical shape, a polygon pyramid shape, a disc shape, or an ax blade shape.

8. A surface property measuring machine comprising:
the detector according to claim 1;
a relative moving part configured to cause the contact to come into contact with a measurement surface of an object to be measured, and relatively move the object to be measured and the contact; and
a surface property measuring part configured to measure a surface property of the object to be measured based on a detection result of the detector.

9. A roundness measuring machine configured to include the surface property measuring machine according to claim 8,
wherein the relative moving part includes a rotating stage configured to rotate an object to be measured, and
the surface property measuring part measures roundness of the object to be measured.

10. A roundness measuring machine configured to include a surface property measuring machine, the surface property measuring machine comprising:
a detector including a stylus configured to support a contact which is brought into contact with a surface of an object to be measured, a holder configured to hold the stylus, a measuring part configured to swingably hold the holder with a rotating shaft and detect a displacement of the holder, and a body configured to accommodate the measuring part, the body having a cylindrical shape, wherein the holder holds the stylus such that a stylus axis being a longitudinal axis of the stylus and a body axis being a longitudinal axis of the body are in parallel with each other, and the stylus axis and the body axis are offset in a first direction orthogonal to the body axis and a longitudinal axis of the rotating shaft;
a relative moving part configured to cause the contact to come into contact with a measurement surface of an object to be measured, and relatively move the object to be measured and the contact; and
a surface property measuring part configured to measure a surface property of the object to be measured based on a detection result of the detector,
wherein the relative moving part includes a rotating stage configured to rotate an object to be measured, and
the surface property measuring part measures roundness of the object to be measured.

* * * * *